United States Patent
Pabolu et al.

(10) Patent No.: US 12,339,997 B2
(45) Date of Patent: Jun. 24, 2025

(54) ENTITY FOCUSED NATURAL LANGUAGE GENERATION

(71) Applicant: Oracle International Corporation, Redwood Shores, CA (US)

(72) Inventors: Praneet Pabolu, Bangalore (IN); Sriram Chaudhury, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 224 days.

(21) Appl. No.: 18/318,308

(22) Filed: May 16, 2023

(65) Prior Publication Data

US 2024/0126924 A1   Apr. 18, 2024

Related U.S. Application Data

(60) Provisional application No. 63/416,779, filed on Oct. 17, 2022.

(51) Int. Cl.
   *G06F 21/62*    (2013.01)
   *G06F 16/34*    (2019.01)
   (Continued)

(52) U.S. Cl.
   CPC ........ *G06F 21/6254* (2013.01); *G06F 16/345* (2019.01); *G06F 40/166* (2020.01);
   (Continued)

(58) Field of Classification Search
   CPC .... G06F 21/6254; G06F 16/345; G06F 40/47; G06F 40/56; G06F 40/284; G06F 40/166;
   (Continued)

(56) References Cited

U.S. PATENT DOCUMENTS 10,546,054 B1     1/2020  Foroughi et al.
2017/0345185 A1*  11/2017 Byron ............. G06F 16/285
(Continued)

FOREIGN PATENT DOCUMENTS

EP    3985540 A1    4/2022

OTHER PUBLICATIONS

C4, Datasets, Available Online at: https://www.tensorflow.org/datasets/catalog/c4#c4multilingual_nights_stay, Dec. 6, 2022, 15 pages.

(Continued)

*Primary Examiner* — Shahriar Zarrineh
*Assistant Examiner* — Gita Faramarzi
(74) *Attorney, Agent, or Firm* — Kilpatrick Townsend & Stockton LLP

(57) ABSTRACT

Method includes populating fake value for each of entities, to generate string of fake entity values that correspond to entities; inserting sentinel token between adjacent fake values included in the string to generate first input data; generating, by natural language generation model, natural language sentences based on first input data, natural language sentences including one or more fake values from the string; analyzing natural language sentences to determine whether any fake value from the string is missing; based on the fake value missing, summarizing, using text summarization model, natural language sentences to generate text summary; concatenating the text summary with the fake value, to generate second input data; and generating, by a next sentence generation model, additional natural language sentence using the second input data, the additional natural language sentence including the fake value. Additional natural language sentence is combined with natural language sentences to generate final natural language sentences.

20 Claims, 12 Drawing Sheets

(51) Int. Cl.
| | |
|---|---|
| G06F 40/166 | (2020.01) |
| G06F 40/216 | (2020.01) |
| G06F 40/284 | (2020.01) |
| G06F 40/40 | (2020.01) |
| G06F 40/47 | (2020.01) |
| G06F 40/56 | (2020.01) |
| G06F 40/58 | (2020.01) |
| G06N 3/045 | (2023.01) |
| G06N 3/09 | (2023.01) |
| G06N 20/00 | (2019.01) |

(52) U.S. Cl.
CPC ......... *G06F 40/216* (2020.01); *G06F 40/284* (2020.01); *G06F 40/40* (2020.01); *G06F 40/47* (2020.01); *G06F 40/56* (2020.01); *G06F 40/58* (2020.01); *G06N 3/045* (2023.01); *G06N 3/09* (2023.01); *G06N 20/00* (2019.01)

(58) Field of Classification Search
CPC ........ G06F 40/40; G06F 40/58; G06F 40/216; G06N 20/00; G06N 3/09; G06N 3/045
See application file for complete search history.

(56) References Cited

U.S. PATENT DOCUMENTS

| | | | | |
|---|---|---|---|---|
| 2019/0096509 | A1* | 3/2019 | Knoop | G16H 50/30 |
| 2019/0287012 | A1* | 9/2019 | Celikyilmaz | G06F 16/345 |
| 2020/0057976 | A1* | 2/2020 | Prakash | G06Q 10/06393 |
| 2020/0126533 | A1* | 4/2020 | Doyle | G10L 15/063 |
| 2020/0134074 | A1* | 4/2020 | Mankovskii | G06F 16/26 |
| 2020/0160032 | A1* | 5/2020 | Allen | G16H 50/30 |
| 2020/0279050 | A1* | 9/2020 | Endler | G06F 16/144 |
| 2021/0004485 | A1 | 1/2021 | Summers et al. | |
| 2021/0097201 | A1 | 4/2021 | Wasicek et al. | |
| 2021/0150432 | A1* | 5/2021 | Rosenberg | G06F 16/283 |
| 2021/0303783 | A1* | 9/2021 | Misra | G06F 16/9024 |
| 2021/0326652 | A1 | 10/2021 | Hazard et al. | |
| 2022/0180234 | A1 | 6/2022 | Kamthe et al. | |
| 2024/0354789 | A1* | 10/2024 | Garvey | G06N 20/00 |
| 2025/0045293 | A1* | 2/2025 | Mcnamara | G06F 16/258 |

OTHER PUBLICATIONS

Dataset Card for "XL-Sum", Available online at: https://huggingface.co/datasets/csebuetnlp/xlsum, 11 pages, retrieved Apr. 21, 2023.

Google-Research-Datasets/C4_200m-Synthetic-Dataset-for-Grammatical-Error-Correction, GitHub, Available Online at: https://github.com/google-research-datasets/C4_200M-synthetic-dataset-for-grammatical-error-correction, Accessed from Internet on May 22, 2023, pp. 1-5.

Language-agnostic BERT Sentence Embedding (LaBSE), Available online at: https://github.com/bojone/labse, Aug. 24, 2020, 3 pages.

Welcome to the Leipzig Corpora Collection / Deutscher Wortschatz, A project of Leipzig University, the Saxon Academy of Sciences and Humanities in Leipzig and the Institute for Applied Informatics. Available online at: https://wortschatz.uni-leipzig.de, 1998, 4 pages.

Dorr et al., Testing Code Using Synthetic Data, Technical Disclosure Commons, Oct. 2, 2019, pp. 1-8.

Galloni et al., A Novel Evaluation Metric for Synthetic Data Generation, Intelligent Data Engineering and Automated Learning, Oct. 2020, 2 pages.

Hendricks, Generate Data Containing Fake Personally Identifiable Information, Available Online at: https://github.com/paulhendricks/generator, Aug. 26, 2015, 8 pages.

Hillborn, Anonymizing Datasets at Scale Leveraging Databricks Interoperability, Databricks, Feb. 13, 2017, 8 pages.

Ladhak et al., Wiki_lingua, Available online at: https://gem-benchmark.com/data_cards/wiki_lingua, 2020, 5 pages.

Lee, Natural Language Generation for Electronic Health Records, npj Digital Medicine, vol. 1, No. 63, Nov. 19, 2018, 7 pages.

Xue et al., mT5: A Massively Multilingual Pre-trained Text-to-Text Transformer, Computation and Language, Mar. 11, 2021, 17 pages.

* cited by examiner

ENTITY FOCUSED NATURAL LANGUAGE GENERATION

CROSS-REFERENCE TO RELATED APPLICATION(S)

The present application is a non-provisional application of and claims the benefit and priority under 35 U.S.C. 119(e) of U.S. Provisional Application No. 63/416,779, filed Oct. 17, 2022, the entire contents of which are incorporated herein by reference for all purposes.

FIELD

The present disclosure relates generally to natural language generation, and more particularly, to machine learning techniques for generating synthetic data for personal identifiable information (PIT) entities via natural language generation.

BACKGROUND

Natural language generation (NLG) is the use of artificial intelligence (AI) techniques to produce written or spoken narratives based on a dataset. NLG is related to human-to-machine and machine-to-human interaction, including computational linguistics, natural language processing (NLP) and natural language understanding (NLU). The AI techniques are executed in a multi-stage process, with each stage further refining the dataset being used to produce content having natural language. The stages may include content analysis, data understanding, document structuring, sentence aggregation, grammatical structuring, and language presentation.

Natural language generation is being used in a variety of ways including personalizing responses, generating media content, generating responses of chatbots or digital assistants, providing reports or analysis of data, creating work product such as emails or documents, messaging and chat responses, for training machine learning (ML) models, etc.

Machine learning is an area of artificial intelligence where computers have the capability to learn without being explicitly programmed. There are different types of ML techniques including supervised learning techniques, unsupervised learning techniques, and others. In a supervised learning technique, an ML model is created and trained using training data, where the training data includes multiple training examples, each training example including an input and a known output corresponding to the input (e.g., a ground truth). To train the ML technique(s) or model(s), precise training data is required to enable the algorithms to understand and learn certain patterns or features (e.g., for chatbots—intent extraction and careful syntactic analysis, not just raw language processing) that the ML technique(s) or model(s) will use to predict the outcome desired (e.g., inference of an intent from an utterance).

The accuracy of ML models is directly proportional to the quantity and quality of training data. Collecting a large amount of diverse training data, especially confidential data, and making sure that it satisfies the task-specific requirements of the customers is a challenging, cost- and time-consuming process.

SUMMARY

Techniques are provided for generating synthetic data for PII entities via natural language generation. The objective of these techniques is to generate text around a set of desired entities that are passed as input to a natural language generation model.

In various embodiments, a computer-implemented method is provided that includes: populating a fake value for each entity within a set of entities, to generate a string of fake entity values that correspond to the entities, respectively; inserting a sentinel token between adjacent fake values included in the string of fake entity values to generate first input data; generating, by a natural language generation model, natural language sentences based on the first input data, where the natural language sentences include one or more fake values from the string of fake entity values; performing pre-processing on the natural language sentences, to generate pre-processed natural language sentences; analyzing the pre-processed natural language sentences to determine whether a fake value from the string of fake entity values is missing in the pre-processed natural language sentences; in response to determining that the fake value is missing, summarizing, using a text summarization model, the pre-processed natural language sentences to generate a text summary; concatenating the text summary with the fake value, to generate second input data; generating, by a next sentence generation model, an additional natural language sentence, based on the second input data, where the additional natural language sentence includes the fake value; combining the additional natural language sentence with the pre-processed natural language sentences to generate a text portion including a first plurality of natural language sentences that are obtained as a result of the combining; post-processing the result of the combining, to generate a collection of final natural language sentences; and outputting the collection of final natural language sentences.

In some embodiments, the pre-processing includes: tokenizing the natural language sentences into a series of tokens; and correcting, using a context correction model, context of the natural language sentences based on the series of tokens to generate corrected natural language sentences.

In some embodiments, the pre-processing further includes: determining a perplexity score for the corrected natural language sentences, and extracting, from the corrected natural language sentences, natural language sentences having the perplexity score of less than a predetermined perplexity threshold.

In some embodiments, the analyzing is performed on the extracted natural language sentences.

In some embodiments, the computer-implemented method further includes: prior to the post-processing, analyzing the text portion to determine whether another fake value from the string of fake entity values is missing in the text portion; in response to determining that the other fake value is missing, summarizing, using the text summarization model, the text portion to generate another text summary; concatenating the other text summary with the other fake value, to generate third input data; generating, by the next sentence generation model, a second additional natural language sentence based on the third input data, where the second additional natural language sentence includes the other fake value; and combining the second additional natural language sentence with the text portion, to obtain another text portion including a second plurality of natural language sentences, where, in the post-processing, the second plurality of natural language sentences is used as the result of the combining.

In some embodiments, the post-processing includes: calculating, using a cross-encoder model, a similarity score between the first plurality of natural language sentences included in the text portion and existing natural language sentences; and determining the collection of final natural language sentences to include natural language sentences having the similarity score less than or equal to a predetermined similarity threshold, from the first plurality of natural language sentences.

In some embodiments, the outputting includes at least one from among transmitting the collection of final natural language sentences to an external device and storing the collection of final natural language sentences in a memory.

In some embodiments, the computer-implemented method further includes: after combining the additional natural language sentence with the pre-processed natural language sentences, repeating the analyzing and, thereafter, repeating the steps of summarizing, concatenating, generating, and combining, in response to determining that at least one other fake value from the string of fake entity values is missing in the text portion.

In some embodiments, the computer-implemented method further includes: appending to each fake value a symbol that identifies a type of entity for a corresponding fake value.

Some embodiments of the present disclosure include a system including one or more data processors. In some embodiments, the system includes a non-transitory computer readable storage medium containing instructions which, when executed on the one or more data processors, cause the one or more data processors to perform part or all of one or more methods and/or part or all of one or more processes disclosed herein.

Some embodiments of the present disclosure include a computer-program product tangibly embodied in a non-transitory machine-readable storage medium, including instructions configured to cause one or more data processors to perform part or all of one or more methods and/or part or all of one or more processes disclosed herein.

The techniques described above and below may be implemented in a number of ways and in a number of contexts. Several example implementations and contexts are provided with reference to the following figures, as described below in more detail. However, the following implementations and contexts are but a few of many.

DETAILED DESCRIPTION

Figure 1:
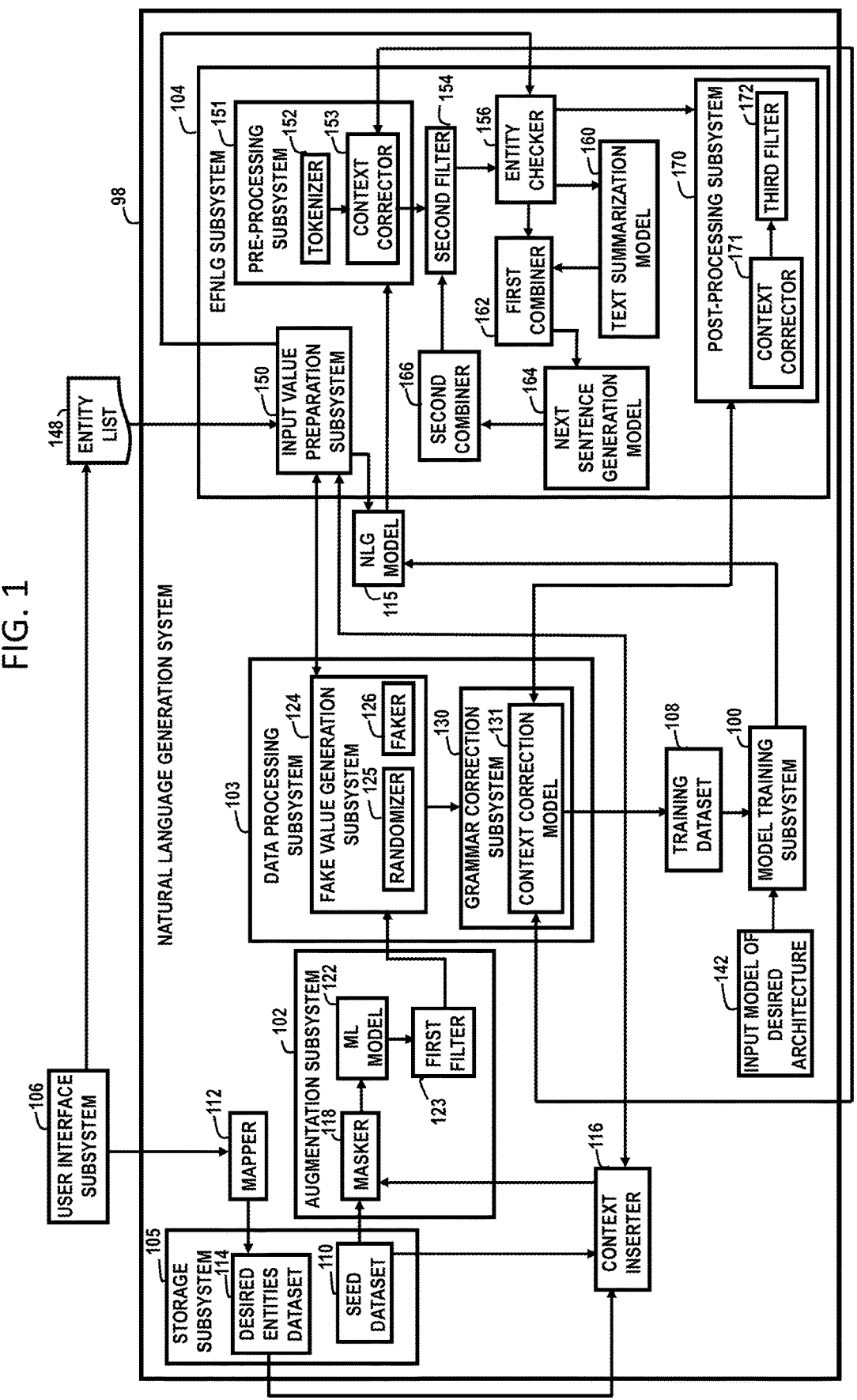
FIG. 1 is a block diagram of a natural language generation system according to various embodiments.

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

I. Introduction

The disclosed techniques are for generating synthetic data for PII entities via natural language generation. The objective of these techniques is to generate realistic text around a set of desired entities that can be passed as an input to a natural language generation model.

The disclosed techniques provide user control over the text that is being generated and the entities that need to be present in the generated text.

PII is any representation of information that permits the identity of an individual to whom the information applies to be reasonably inferred by either direct or indirect means. PII may include information that directly identifies an individual (e.g., name, address, social security number or other identifying number or code, telephone number, email address, etc.) or may include information by which an agency intends to identify specific individuals in conjunction with other data elements, i.e., indirect identification, where the data elements may include a combination of gender, race, birth date, geographic indicator, and other descriptors. Additionally, information permitting the physical or online contacting of a specific individual is the same as PII.

The PII information can be maintained in paper, electronic format, or other media. Sensitive PII is PII which if lost, compromised, or disclosed without authorization, could result in harm, embarrassment, inconvenience, or unfairness to an individual. Consequently, there are numerous safeguards in place to obscure or remove sensitive PII from the public domain.

The related art training of the models for performing NLG starts with pre-labeled training data. In a supervised machine-learning setting, particularly in this problem, the challenge is centered around the lack of sufficient training data with pre-labeled data for the models to learn from. Publicly available data for PII (e.g., username, user identifier such as social security number, insurance number, driver's license number, and the like), which is user level information, is scarce at best and typically unattainable. Similar problems persist in other domains using confidential entity information, e.g., financial, security, medical domains, and others.

The related approaches for generating the synthetic data, e.g., back translation, augmentation, seed-text based NLG, and masked-word completion can be used to address the lack of sufficient training data. However, these approaches fail to capture the interrelationships between the entities and the text or context associated with the entities.

For example, back translation requires some initial amount of data that is translated into another language, e.g., German. Then, the German text is translated back to English in order to change the particular text. However, in this method, a particular required entity, e.g., a person's name, may be translated into a different language. This is problematic because the generated text might be inaccurate.

In the augmentation technique, the synonyms of a particular word are used in place of that word. However, since the entire sentence does not change, the semantic meaning of the text being generated through augmentation is also going to be the same. For example, the augmentation technique does not generate diverse texts.

The seed-text based NLG uses a small seed text, e.g., a person's name. The model is then tasked with generating a part of the sentence, e.g., to include this person's address. However, the seed-text based NLG model might generate the text with the wrong address. As such, the generated text will be inaccurate.

The masked-word completion suffers from the similar deficiencies as described above and cannot generate texts with reliably accurate entities and contextual coherence.

As a result, although the generated synthetic data of the related art methods may be semantically comparable to the original data, the entities required for training a machine learning model cannot be sustained. Any machine-learning model is only as good as the training data it was trained on. Thus, the training data quality is determinative of the model behavior and performance.

In order to address the above-noted challenges and others, various embodiments described herein generate synthetic data to capture the relationships between entities and texts tied to the entities such that the synthetic data is semantically comparable to the original data. For example, the disclosed techniques can generate realistic texts around predefined PII entities, where the generated texts are grammatically accurate and have a great degree of diversity.

In various embodiments, a computer-implemented method is provided that includes: populating a fake value for each entity within a set of entities, to generate a string of fake entity values that correspond to the entities, respectively; inserting a sentinel token between adjacent fake values included in the string of fake entity values to generate first input data; generating, by a natural language generation model, natural language sentences based on the first input data, where the natural language sentences include one or more fake values from the string of fake entity values; analyzing the natural language sentences to determine whether a fake value from the string of fake entity values is missing in the natural language sentences; in response to determining that the fake value is missing, summarizing, using a text summarization model, the pre-processed natural language sentences to generate a text summary; concatenating the text summary with the fake value, to generate second input data; generating, by a next sentence generation model, an additional natural language sentence, based on the second input data, where the additional natural language sentence includes the fake value; and combining the additional natural language sentence with the natural language sentences to generate a collection of final natural language sentences.

II. Natural Language Generation System

FIG. 1 is a simplified block diagram of a natural language generation system 98 according to certain embodiments. The natural language generation system 98 may be implemented using one or more computer systems, each computer system having one or more processors. The natural language generation system 98 may include multiple components and subsystems communicatively coupled to each other via one or more communication mechanisms. For example, in the embodiment depicted in FIG. 1 the natural language generation system 98 includes a model training subsystem 100, an augmentation subsystem 102, a data processing subsystem 103, and an entity focused natural language generation (EFNLG) subsystem 104. These subsystems may be implemented as one or more computer systems. The systems, subsystems, and other components depicted in FIG. 1 may be implemented in software (e.g., code, instructions, program) executed by one or more processing units (e.g., processors, cores) of the respective systems, using hardware, or combinations thereof. The software may be stored on a non-transitory storage medium (e.g., on a memory device).

As shown in FIG. 1, the natural language generation system 98 also includes a storage subsystem 105 that may store various datasets, data constructs, and programs used by the natural language generation system 98, as described in detail below. In certain implementations, the natural language generation system 98 may further include a user interface (UI) subsystem 106 for receiving a user input.

The natural language generation system 98 depicted in FIG. 1 is merely an example and is not intended to unduly limit the scope of embodiments. Many variations, alternatives, and modifications are possible. For example, in some implementations, natural language generation system 98 may have more or fewer subsystems or components than those shown in FIG. 1, may combine two or more subsystems, or may have a different configuration or arrangement of subsystems. The natural language generation system 98 and subsystems depicted in FIG. 1 may be implemented using one or more computer systems, such as the computer system depicted in FIG. 12.

Figure 2:
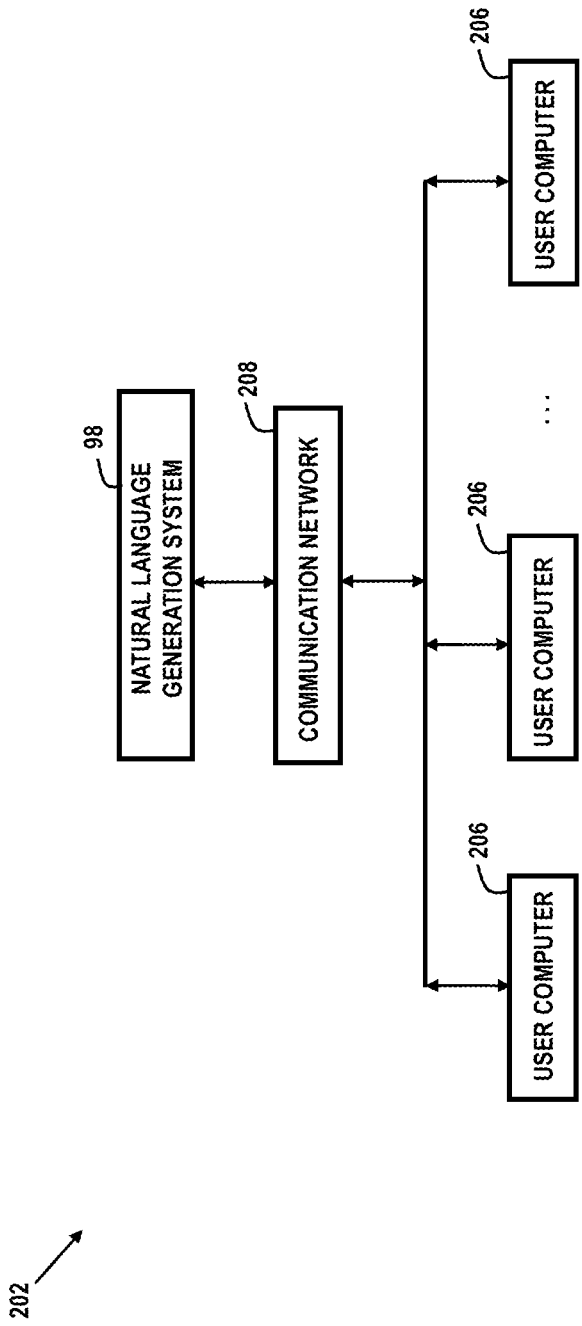
FIG. 2 is a simplified block diagram of a natural language generation system in a distributed computing environment according to various embodiments.
Figure 12:
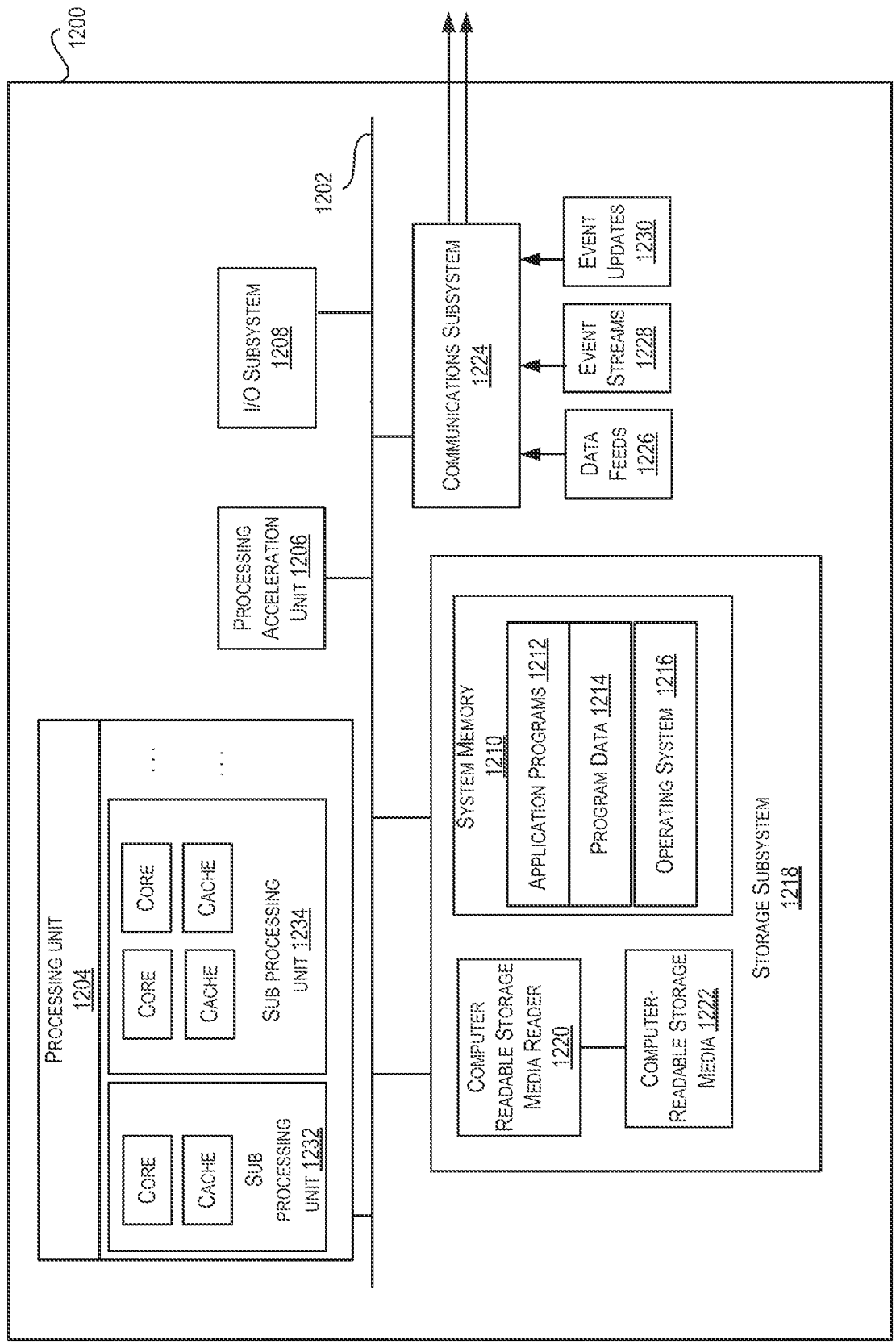
FIG. 12 is a block diagram illustrating an example computer system, according to at least one embodiment.

As shown in FIG. 2, the natural language generation system 98 can be provided as a part of a distributed computing environment 202, where the natural language generation system 98 is connected to one or more user computers 206 via a communication network 208. An example of a distributed computing environment is depicted in FIG. 12 and described in detail below.

Figure 3:
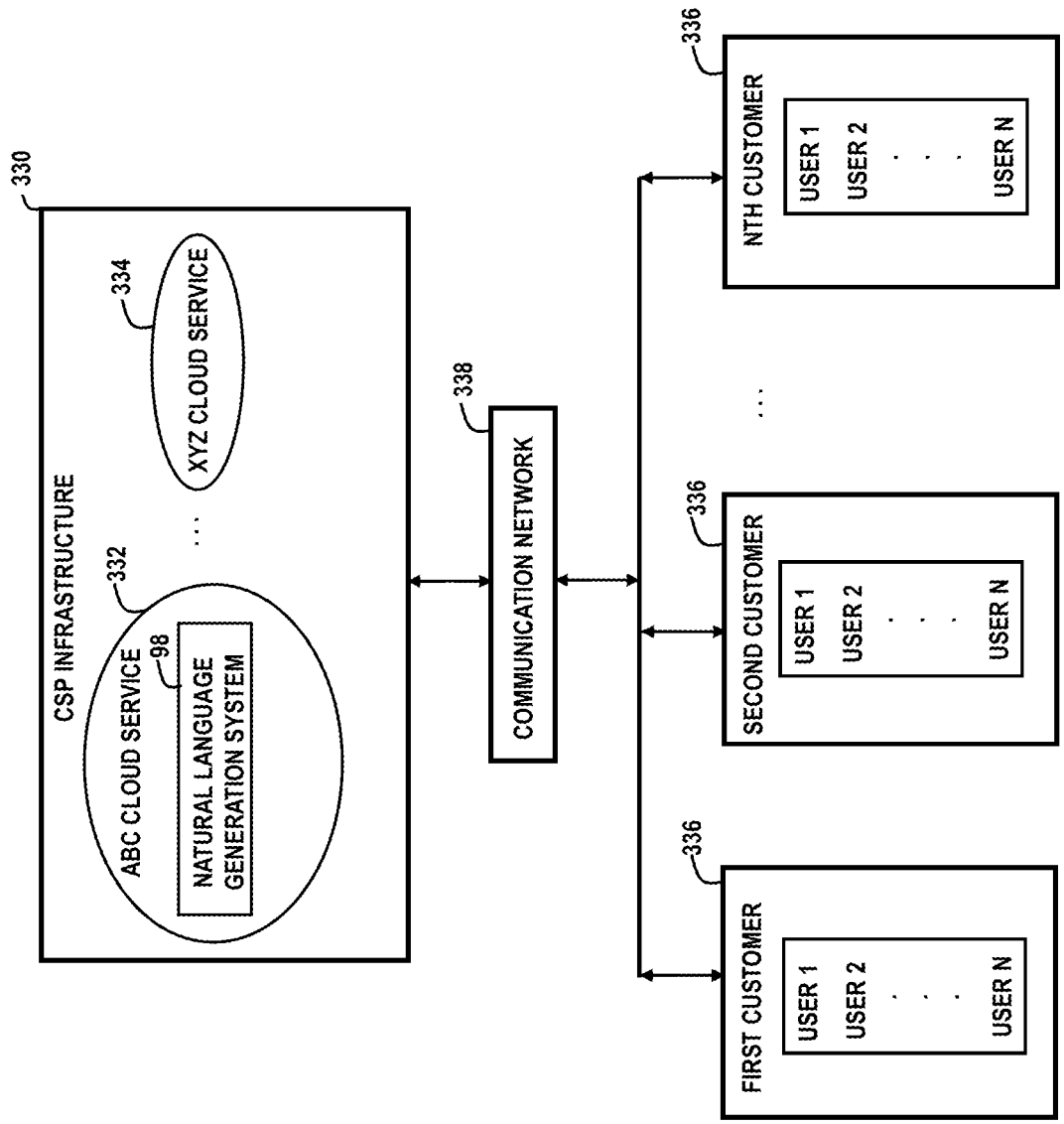
FIG. 3 is a simplified block diagram of a natural language generation system in a cloud service provider (CSP) infrastructure according to various embodiments.

As shown in FIG. 3, the natural language generation system 98 may be a part of a CSP infrastructure 330 provided by a CSP for providing one or more cloud services. For example, the one or more cloud services may include ABC cloud service 332 to XYZ cloud service 334 connected to computers of one or more customers 336 via a communication network 338. For example, the natural language generation system 98 may be a part of the ABC cloud service 332.

Examples of a cloud infrastructure architecture provided by a CSP are depicted in FIGS. 8-11 and described in detail below.

The processes and functions of the subsystems of the natural language generation system 98 are described below in detail.

1. Training Dataset Preparation

With continuing reference to FIG. 1, the augmentation subsystem 102 and the data processing subsystem 103 cooperate to prepare a training dataset 108, based on a seed dataset 110 having a small number of annotated samples, e.g., 800 samples. As a result of the processing performed by the augmentation subsystem 102 and the data processing subsystem 103 on the seed dataset 110, the training dataset 108 having thousands of samples, e.g., 5000 different samples, may be generated and then can be used by the model training subsystem 100 to train a model capable of outputting natural language texts generated around the desired entities.

In some embodiments, the natural language generation system 98 can include a mapper 112. The mapper 112 may receive a selection of a set of desired entities by receiving a user input through the UI subsystem 106. The mapper 112 can then assign a digital number to each desired entity. However, this is not intended to be limiting. For example, the mapper 112 may assign a different character to each desired entity, as for example, a letter of an alphabet, an alphanumeric value, etc.

Table 1 below shows a non-limiting example of a set of the desired entities, where the first column shows the desired entities and the second column shows the digital numbers assigned to each entity. For example, in Table 1, the desired entities are mapped to the assigned digital numbers.

TABLE 1

| Entity | Entity Number |
| --- | --- |
| ADDRESS | 0 |
| SSN | 1 |
| PASSPORT_NUMBER | 2 |
| DRIVER_ID | 3 |
| BANK_ACCOUNT_NUMBER | 4 |
| BANK_ROUTING | 5 |
| BANK_SWIFT | 6 |
| CREDIT_DEBIT_EXPIRY | 7 |
| CREDIT_DEBIT_NUMBER | 8 |
| TAXPAYER_ID | 9 |
| ACCOUNT_CREDENTIALS | 10 |
| API_KEY | 11 |
| AGE | 12 |
| DATE_TIME | 13 |
| PERSON | 14 |
| EMAIL | 15 |
| TELEPHONE_NUMBER | 16 |
| IP_ADDRESS | 17 |
| MAC_ADDRESS | 18 |
| LICENSE_PLATE_NUMBER | 19 |

In an example of Table 1, the entity "address" is mapped to 0, the entity "social security number (SSN)" is mapped to 1, etc. The data structure shown in Table 1 can be stored in the storage subsystem 105 as a desired entities dataset 114 where the desired entities may be mapped to, e.g., associated with, the assigned numbers.

For training an entity-based NLG model, e.g., an NLG model 115, the training dataset 108 is created in such a manner that it has the contextual information attached to each entity value, to identify the entity type. The entity values are then concatenated with a special sentinel token "<||>", to form a string of entity values.

For example, the natural language generation system 98 can include a context inserter 116. The context inserter 116 can receive the samples from the seed dataset 110 and append contextual information, e.g., predetermined context, to the samples. Each of the samples in the seed dataset 110 may be a text portion, e.g., a paragraph, that has one or more sentences and includes at least one entity value. Further, the annotation may be provided for each of the samples to identify the names of the entities, e.g., the entity types, corresponding to the entity values. The seed dataset 110 is constructed so that all entities from the set of desired entities are included.

The context inserter 116 can combine each of the entity values present in each sample of the seed dataset 110 with the assigned number using mapping stored in the desired entities dataset 114. For example, the assigned number may be appended at both ends of the entity value, where a symbol "<" is appended before the assigned number and a symbol ">" is appended after the assigned number. Additionally, the context inserter 116 may join entity values, e.g., concatenate entity values, with the sentinel token "<||>". The generated strings of entity values correspond to each of the text portions and may be used as input training datapoints for training performed to generate the NLG model 115 as described in detail below.

By adding the context (e.g., in this case, the numbers 0, 1, 2, etc.), it is possible to make sure that the NLG model will learn about each of the entity values along with its entity name, e.g., type, so that during the natural language generation, the trained NLG model 115 will know where to place the supplied input entity value.

Table 2 shows an example of a structure of a portion of the dataset generated by appending the contextual information to the entity values of the samples of the seed dataset 110. In some embodiments, the training dataset 108 used by the model training subsystem 100 to generate the NLG model 115 has the same data structure.

TABLE 2

| Input Entity Values | PII Entities | Text |
| --- | --- | --- |
| <14> Mrs. Natalie Adams <14> <||> <1> 626-30-0611 <1> <||> <0> 5194 Smith Via, New Michaelview, PA 97880 <0> | ['PERSON', 'SSN', 'ADDRESS'] | In the order to set up a royalty payment action plan for planning your next brain surgery, we do really need forum some recently more personal information Mrs. Natalie Adams. Obviously First, we do need to thoroughly confirm that your genetic identity. Is there your personal social security number 626-30-0611? And is there your very current home Johannesburg address 5194 Smith Via, New Michaelview, PA 97880? |
| <14> Proctor <14> <||> <19> 6XYP208 <19> | ['PERSON', 'LICENSE_PLATE_NUMBER'] | This is officer Proctor. I am following a car with the license plate number |

TABLE 2-continued

| Input Entity Values | PII Entities | Text |
|---|---|---|
| <4> GB16HICO57198393517117 <4> <\|\|> <16> (991)909-9129x5002 <16> <\|\|> <16> 615.853.4694 <16> | ['BANK_ACCOUNT_NUMBER', 'TELEPHONE_NUMBER', 'TELEPHONE_NUMBER'] | 6XYP208. It is being pursued on highway 100. They are traveling at an excessive rate of speed. Regarding account GB16HICO57198393517117, we may have been cases attempting to contact you at (991)909-9129x5002. There have recently been still multiple reported transactions involving bringing your current balance below 0, and creating serious overdraft in fees. We need to thoroughly verify if these specific transactions actually were authorized. Please call us at your earliest convenience at 615.853.4694. |

In Table 2, column 2 shows the entities that may be desired for the text generation. Column 1 shows an input that will be provided to the model training subsystem 100, e.g., the entity values with the appended numbers and sentinel tokens between the entity values. Column 3 shows the output text that includes the entity values of column 1.

For example, in the second row of Table 1, the PII entity "license plate number" is assigned the number 19. As shown in the second row of Table 2, the number 19 is appended to the entity value "6XYP208" corresponding to the PII entity "license plate number," to create a labeled entity value "<19> 6XYP208 <19>" that identifies a type of the PII entity, e.g., "license plate number."

Similarly, in Table 1, the PII entity "person" is assigned the number 14. In Table 2, the number 14 is appended to the entity value "Proctor" corresponding to the PII entity "person," to create a labeled entity value "<14> Proctor <14>" that identifies a type of the PII entity, e.g., "person."

A sentinel token is inserted to separate two entity values. The output text that is expected to be generated by the NLG model is created around two input labeled entity values, e.g., "This is officer Proctor. I am following a car with the license plate number 6XYP208. It is being pursued on highway 100. They are traveling at an excessive rate of speed."

2. Training Dataset Enhancement

The augmentation subsystem 102 is configured to receive, as an input, the samples of the seed dataset 110 that have a data structure shown in Table 2.

For simplicity of description, the seed dataset 110 that has a modified data structure may be referred herein to as "modified seed dataset."

The augmentation subsystem 102 then implements various enhancement techniques on the samples of the modified seed dataset, e.g., sentences of the seed dataset 110.

For example, the augmentation subsystem 102 may include a masker 118. The masker 118 may receive the samples of the modified seed dataset and mask, e.g., obscure, the entity values present in the samples.

For example, the masker 118 can mask all entity values shown in column 1 and column 3 of Table 2 with different entity values and special characters around them (e.g., <$PERSON>), or assign a different random number (e.g., 87335) for each entity value.

The examples of masking are shown below:
a. Example: My name is Robert→My name is <$PERSON>
b. Example: My name is Robert→My name is 87335

The masker 118 can maintain the mapping of the true entity values and the obscured values that mask the true entity values for future reference.

In order to increase a number of samples of the seed dataset and make uniform the distribution of the available entities, various data enhancement processes may be implemented.

In some implementations, the augmentation subsystem 102 is configured to perform augmentation on the masked data of the sentences of the seed dataset 110. For example, the augmentation subsystem 120 performs augmentation using a machine learning (ML) model 122.

As used herein, a "machine learning model" or a "model" can refer to a software code configured to be run on one or more processors to provide a classification or numerical value of a property of one or more samples. An example type of model is supervised learning that can be used with embodiments of the present disclosure. Example supervised learning models may include different approaches and algorithms including analytical learning, artificial neural network, backpropagation, boosting (meta-algorithm), Bayesian statistics, case-based reasoning, decision tree learning, inductive logic programming, Gaussian process regression, genetic programming, group method of data handling, kernel estimators, learning automata, learning classifier systems, minimum message length (decision trees, decision graphs, etc.), multilinear subspace learning, naive Bayes classifier, maximum entropy classifier, conditional random field, nearest neighbor algorithm, probably approximately correct learning (PAC) learning, ripple down rules, a knowledge acquisition methodology, symbolic machine learning algorithms, subsymbolic machine learning algorithms, minimum complexity machines (MCM), random forests, ensembles of classifiers, ordinal classification, statistical relational learning, or Proaftn, a multicriteria classification algorithm.

The model may include linear regression, logistic regression, deep recurrent neural network (e.g., long short term memory, LSTM), hidden Markov model (HMM), linear discriminant analysis (LDA), k-means clustering, density-based spatial clustering of applications with noise (DBSCAN), random forest algorithm, support vector machine (SVM), or any model described herein. Supervised learning models can be trained in various ways using various cost/loss functions that define the error from the known label (e.g., least squares and absolute difference from known classification) and various optimization techniques, e.g., using backpropagation, steepest descent, conjugate gradient, and Newton and quasi-Newton techniques.

In some embodiments, the machine learning models could include, but not limited to, convolutional neural network (CNN), linear regression, logistic regression, deep recurrent neural network (e.g., fully-connected recurrent neural network (RNN), Gated Recurrent Unit (GRU), long short-term memory, (LSTM)), transformed-based methods (e.g. XLNet, BERT, XLM, RoBERTa), Bayes' classifier, hidden Markov model (HMM), linear discriminant analysis (LDA), k-means clustering, density-based spatial clustering of applications with noise (DBSCAN), random forest algorithm, adaptive boosting (AdaBoost), eXtreme Gradient Boosting (XGBoost), support vector machine (SVM), or a composite model including one or more models proposed above.

In embodiments, the ML model 122 may be a BERT cased model that is pretrained on a given language using a masked language modeling (MLM) objective. For the BERT uncased, the text is lowercased before the tokenization step, while for the BERT cased, the text is same as the input text (no changes with respect to a font case). For example, if the input is "OpenGenus," then it is converted to "opengenus" for BERT uncased while BERT cased takes in "OpenGenus."

The ML model 122 receives, as an input, sentences obtained from the text portions of the seed dataset 110 that have masked entity values and outputs augmented sentences where the masked entity values are maintained.

Continuing with the above example (b), suppose that the ML model 122 receives, from the masker 118, as an input, a sentence "My name is 87335." The ML model 122 can generate an augmented sentence based on the input sentence, while maintaining the obscured value. For example, the ML model 122 can generate, as an output, a sentence "87335 is my name." In this manner, the sentences of the seed dataset 110 with the masked entity values are provided as an input to the ML model 122 that generates the augmented sentences as an output.

To ensure the quality and diversity of the generated augmented sentences, the augmentation subsystem 102 may include a first filter 123 configured to identify the augmented sentences that are not sufficiently different from their counterpart seed sentences. The first filter 123 may receive the augmented sentences and filter out sentences that have not obtained a relative diversity. For example, the first filter 123 may include one or more machine learning models that can determine a cosine similarity and/or a cross-encoder score with respect to the original sentences, e.g., the sentences of the seed dataset having masked values, and corresponding augmented sentences.

The cosine similarity is a metric that measures the similarity between two vectors of an inner product space. It is measured by the cosine of the angle between two vectors and determines whether two vectors are pointing in roughly the same direction.

The cross-encoder similarity is another metric. In contrast to the cosine similarity, this metric works on sentence pairs (i.e., a pair of a seed dataset sentence and an augmented sentence) and is based on a transformer architecture model where both sentences are passed simultaneously to the model that in turn produces an output value between 0 and 1 indicating the similarity of the input sentence pair.

In certain implementations, to increase diversity of texts, the first filter 123 filters out, e.g., excludes from further processing, paragraphs having the augmented sentences with the cosine similarity score greater than 85% and/or the cross-encoder similarity score greater than 75% with respect to the original sentences having masked data.

The cosine similarity score that is less than or equal to 85% signifies that the text of the seed dataset 110 is at most 85% similar to the corresponding augmented text.

The cross-encoder score that is less than or equal to 75% signifies that the text of the seed dataset 110 is at most 75% similar to the corresponding augmented text.

The data processing subsystem 103 receives augmented text having the augmented sentences passed through by the first filter 123, where the augmented sentences have masked entity values. The data processing subsystem 103 also receives input strings having concatenated masked entity values corresponding to the augmented texts. The data processing subsystem 103 then performs certain processing on the received data to further increase diversity of the texts and output texts with enhanced grammar and context.

For example, the data processing subsystem 103 may include a fake value generation subsystem 124 that generates various fake values for masked entity values.

In some embodiments, the fake value generation subsystem 124 includes a randomizer 125 and faker 126. The faker 126 may be a Python package that generates fake data, as known to those skilled in the relevant art.

The randomizer 125 is used because the Python's faker generally has tendency to miss on numerous situations that are seen in the real world. Therefore, the faker 126 is not applied on all of the masked entity values. By using the randomizer 125, the augmented texts can be provided with the values such as festivals, holidays, important days, some age-restriction texts, etc.

The randomizer 125 is configured to replace the obscured values corresponding to some of the entity values, e.g., first entity values of the masked entity values, using a pseudo-random process where a set of masked values (e.g., numbers and texts) are provided with predefined context. As a non-limiting example, the first entities may include one or more of DATE_TIME, AGE, and PERSON. The examples of the fake values given by the randomizer 125 to the first entities are shown below:

| Entity: | Fake values: |
| --- | --- |
| DATE_TIME: | Today, weekdays, tonight, yesterday, festivals, etc. |
| PERSON: | Long names (e.g., greater than 2 words), randomized prefixes, non-binary person names, etc. |
| AGE: | 20 years, 30 years, 2 months, 1 month, etc. |

For example, the entity "DATE_TIME" in the sentence "I go to school every day in the morning," can be variously changed to create a diverse content, e.g., "I go to school every day at 8 in the morning," "I go to school every day at 8 am," etc.

The faker 126 is configured to replace the obscured values corresponding to some of the entity values, e.g., second entity values of the masked entity values, with fake values. The second entity values may correspond to the entities that are not the first entities.

For the augmented texts that are generated as described above, there is a high possibility that the context and the grammar of the sentences are inaccurate.

Accordingly, the data processing subsystem 103 can include a grammar correction subsystem 130. In certain implementations, the grammar correction subsystem 130 includes a context correction model 131.

The context correction model 131 may be a custom context correction model trained on a large corpus of data such as the publicly available C4 synthetic dataset.

An example of the samples, e.g., training datapoints, of the dataset is shown in Table 3.

TABLE 3

| Input | Output |
|---|---|
| In some Photos, his expression is identical to one of mums girlie, who is also on a highly strung side (very sensitive girl, easily distressed). | In some of the photos, his expression is identical to my mum's girlie, who is also on the highly strung side (very sensitive girl, easily distressed). |
| There can be considered two accident insurance | There are two kinds of accident insurance. |

The large dataset having a structure similar to the structure shown in Table 3 is used to fine-tune an NLP model implemented as a transformer such as a T5-based model. This results in the generation of the context correction model 131. The context correction model 131 is then used on each of the sentences tokenized using a Natural Language Toolkit (NLTK) to correct the context of the sentences. The training of the models, e.g., the context correction model 131 is described in a greater detail below with reference to FIG. 5.

In certain implementations, the data processing subsystem 103 is configured to generate and output the training dataset 108 using the sentences output by the context correction model 131. For example, the training dataset 108 may have the data structure as shown in Table 2, where the entity values of column 1 are concatenated entity values, e.g., fake values, and the text portions of column 3 include sentences output by the context correction model 131 that include the corresponding fake values.

The training dataset 108 may be used by the model training subsystem 100 for training the NLG model 115 and can be optionally stored in the storage subsystem 105.

3. Natural Language Generation Model Training

The model training subsystem 100 performs training using the training dataset 108, to generate the NLG model 115.

In various embodiments, to generate the NLG model 115, the model training subsystem 100 trains an input model 142, e.g., a machine learning model, of a desired architecture. For example, the input model 142 may be a transformer such as a T5-based model. The input model 142 includes hyperparameters optimized to accept an input of larger sized tokens (i.e., at least 1024-sized tokens) and generate an output of larger-sized token text (i.e., at least 1024-sized token texts). By default, the original T5-large model could accept and generate 512-sized tokens. However, for the NER-based model, text, e.g., a paragraph, may have a length of around 5000 characters. Accordingly, the NLG model 115 should be capable of generating larger sentences, which are typically present in the realistic data. In order to approach that objective, in the disclosed techniques, the hyperparameters of the T5-based model are changed to accept an input of 1024 that is a number of words that could be present within a particular sentence. When the model is given a certain single input, the model will be able to generate a maximum of 1024 words output as text.

The model training subsystem 100 receives, as an input, the input model 142 and trains the input model 142 using the training dataset 108, where the concatenated entity values (e.g., fake values), which are shown in column 1 of Table 2, are passed as the inputs to the input model 142 that is tasked to output text generated around the input entity values, as shown in column 3 of Table 2. For example, each string of concatenated entity values of a row of Table 2 serves as an input training datapoint and corresponding text portion serves as an output.

In certain embodiments, training the input model 142 using the training dataset 108 involves iterative operations to find a set of parameters for the input model 142 that minimizes a loss or error function for the input model 142, where each iteration includes finding the set of parameters for the input model 142 so that a value of the loss or error function using the set of parameters is smaller than a value of the loss or error function using another set of parameters in a previous iteration, and where the loss or error function is configured to measure a difference between outputs inferred by the input model 142 for the inputs in the training dataset 108 and the outputs in the training dataset 108 that are predetermined for these inputs. Once an optimal set of parameters is determined, the model is considered to be trained for a corresponding task. The training of the models is described in a greater detail below with reference to FIG. 5.

As a result of the training performed by the model training subsystem 100, the NLG model 115 is generated and can be used by the EFNLG subsystem 104, to generate entity focused texts based on an input of an entity list 148, e.g., a set of entities, as described below.

In some embodiments, the NLG model 115 may be stored, e.g., in the storage sub system 105.

4. Entity Focused Natural Language Generation

In certain implementations, the EFNLG subsystem 104 may include an input value preparation subsystem 150. The input value preparation subsystem 150 may receive an input of or otherwise obtain the entity list 148, e.g., ['DATE_TIME', 'DATE_TIME', 'PERSON', 'DATE_TIME', 'ADDRESS']. For example, the input value preparation subsystem 150 may receive an input of a set of entities, e.g., the entity list 148, by receiving a user input through the UI subsystem 106. The input value preparation subsystem 150 then can determine the fake values for the entities included in the entity list 148. For example, the input value preparation subsystem 150 may prepare a list of fake values or a string of fake values to include the fake values corresponding to all entities on the entity list 148. For example, the input value preparation subsystem 150 can use the fake value generation subsystem 124 to generate the fake values. The operation of the fake value generation subsystem 124 is described above.

After the fake values are generated, the input value preparation subsystem 150 can append context to the fake values. For example, the input value preparation subsystem 150 can use the context inserter 116 to append context to the fake value. For example, the context inserter 116 can combine each of the entity values, e.g., the fake values, with the assigned number using mapping stored in the desired entities dataset 114. For example, the assigned number may be appended at both ends of the fake entity value, where a symbol "<" is appended before the assigned number and a symbol ">" is appended after the assigned number. Additionally, the context inserter 116 may separate entities, e.g., concatenate entities, with the sentinel token "<||>", to generate a string of fake values. In embodiments described below, it is assumed that the entity values are represented by fake values, unless noted otherwise.

The concatenated entity values with the appended context may be then provided as an input, e.g., an input value, to the NLG model 115. The NLG model 115 is configured to perform certain processing on the concatenated entity values that results in outputting, by NLG model 115, the natural language text generated around the entity values based on the entity type that is identified by the appended numbers. Each portion of the natural language text, e.g., a paragraph, includes sentences that include one or more entity values corresponding to entities from the entity list 148.

In certain implementations, the EFNLG subsystem 104 may further include a pre-processing subsystem 151. The pre-processing subsystem 151 may perform processing operations on the natural language text output by the NLG model 115.

For example, the pre-processing subsystem 151 may include a tokenizer 152 and a context corrector 153. The tokenizer 152 receives the text from the NLG model 115 and tokenizes sentences present in the text. The context corrector 153 corrects grammar and/or context of the tokenized sentences. For example, the context corrector 153 includes a machine learning model that is trained to correct grammar and/or context of the sentences.

In some embodiments, the context corrector 153 can be omitted and the tokenized sentences may be provided to the grammar correction subsystem 130 that can then use the context correction model 131 to correct the grammar and/or context of the sentences.

The pre-processing subsystem 151 may further include a second filter 154. In some embodiments, the second filter 154 may be provided separately from the pre-processing subsystem 151.

The second filter 154 may receive the corrected sentences and filter out sentences that do not meet a predetermined metric, e.g., a perplexity score. For example, the second filter 154 may include a machine learning model that can calculate the perplexity score. The perplexity is a measurement of how well a probability model predicts a sample. In the context of natural language processing, perplexity is a way to evaluate the probability distribution over sentences (Language Model): to be both able to generate plausible human-written sentences, as in the case of a good language model, and to evaluate the goodness of already written sentences. When presented with a well-written document, a good language model should be able to give the document a higher probability than to a poorly written document, i.e., it should not be perplexed when presented with a well-written document. Thus, the perplexity metric in NLP is a way to capture the degree of uncertainty a model has in predicting text, where the lower perplexity score is a measure of a better sentence, e.g., text.

In certain implementations, the second filter 154 extracts one or more sentences having the perplexity score less than a predetermined perplexity threshold, e.g., 35%. The second filter 154 filters out, e.g., excludes from further processing, any sentence having the perplexity score equal to or greater than the predetermined perplexity threshold, e.g., 35%. The sentence having a perplexity score of 20-60% is generally considered to be a good sentence but a threshold of less than 35% is chosen since the NLG model 115 is generating the sentences with a model similar to the one that is used for calculating perplexity. The perplexity score metric is used at a sentence level rather than at a paragraph level. The sentences containing the entity values corresponding to the address entity type are excluded from the calculations because the addresses in the generated sentences are entirely random.

For simplicity of description, it is assumed that the second filter 154 extracts at least one sentence included in the generated paragraph.

The EFNLG subsystem 104 may further include an entity checker 156. For example, the entity checker 156 can obtain the (fake) entity values generated by the input value preparation subsystem 150 with respect to all entities included in the entity list 148. The entity checker 156 can determine whether all entity values corresponding to the entities from the entity list 148 are present in the sentences extracted by the second filter 154. The entity checker 156 can then generate a list of missing entity values that are missing in the extracted sentences. The list of missing entity values may include one or more missing entity values.

In certain implementations, the EFNLG subsystem 104 may include a text summarization model 160 that is trained to provide a text summary based on sentences provided as an input.

In the case that the entity checker 156 determines that at least one entity value is missing in the extracted sentences, the EFNLG subsystem 104 can activate the text summarization model 160. The entity checker 156 can pass, to the text summarization model 160, the extracted sentences output by the second filter 154. The text summarization model 160 can summarize the extracted sentences and provide an output that is a text summary of the extracted sentences.

As an example, based on the extracted sentences, the text summary may look as follows:

"Haylie, we did have the wrong credit card information, it was listed as 5515-8395-2066-3160. I do apologize that you still have not received that package which was supposed to be in the mail on Saturday, July 2."

The EFNLG subsystem 104 may also include a first combiner 162 and a next sentence generation model 164. The next sentence generation model 164 is trained to predict a next sentence based on a summary of the text that is provided as an input to the next sentence generation model 164 and further based on a string of keywords, e.g., entity values. The next sentence can be then appended to the previously generated text to generate a coherent natural language text.

The first combiner 162 receives, as an input, a missing entity value from the list of missing entity values determined by the entity checker 156. The first combiner 162 also receives, as an input, the text summary from the text summarization model 160 and concatenates, e.g., combines, the text summary with the missing entity value.

In an example, the missing entity may be a date, e.g., with a value "May 27$^{th}$." The combined text summary and the missing entity value can look as follows:

"Haylie, we did have the wrong credit card information, it was listed as 5515-8395-2066-3160. I do apologize that you still have not received that package which was supposed to be in the mail on Saturday, July 2. <||> <13> May 27th <13>"

As shown, the text summary is combined with a string including a sentinel token and the entity value, where the entity value is identified as an address by the assigned number "13" enclosed in special symbols, e.g., <13>. The sentinel token is inserted between the text summary and the entity value that is appended at both ends with the contextual information, e.g., <13>, thereby the text summary and the entity value are joined or concatenated by the sentinel token.

The next sentence generation model 164 is configured to receive, as an input, the combined text summary and missing entity value that are formatted as shown above. The next sentence generation model 164 then can generate, based on the context of the text summary, a next sentence that includes the provided missing entity value from the list of missing entity values, where the next sentence is contextually consistent with the extracted sentences that were output by the second filter 154 and correspond to the initial text generated by the NLG model 115.

Based on the above examples, the next sentence may be generated as follows: "I will change that as soon as possible, and you should be receiving your package before May 27th!"

A second combiner 166 can append the next sentence to the end of the text including the extracted sentences that were output by the second filter 154 and correspond to the initial text generated by the NLG model 115.

The text generated by the second combiner 166 can be then provided again to the second filter 154 for processing described above. However, this is not intended to be limiting. In certain implementations, the text generated by the second combiner 166 can be first provided to the tokenizer 152 and the context corrector 153, for processing described above. Then, the resultant text can be provided to the second filter 154.

The entity checker 156 then checks the text again. If the entity checker 156 determines that not all entity values corresponding to the entities from the entity list 148 are present, the process is repeated as described above.

If the entity checker 156 determines that all entity values corresponding to the entities from the entity list 148 are present, the text is considered to be complete and the text is passed to a post-processing subsystem 170.

As described above, the EFNLG subsystem 104 processes one missing entity value at a time and generates one next sentence to include the missing entity value. However, this is not intended to be limiting. For example, the next sentence generating model 164 may generate any number of sentences based on the context of the text summary provided by the text summarization model 160, e.g., 2, 3, etc., where the sentences output by the next sentence generating model 164 include the missing entity value provided as an input to the first combiner 162. Additionally, the next sentence generating model 164 may generate one or more sentences based on the context of the text summary provided by the text summarization model 160 and any number of missing entity values provided as an input to the first combiner 162, e.g., 2, 3, etc. In the case that a plurality of missing entity values is provided to the first combiner 162, the missing entity values are concatenated using the sentinel token, as described above.

Figure 7:
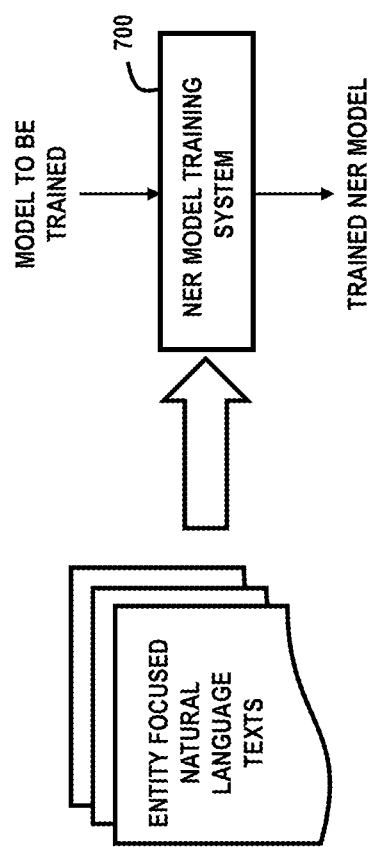
FIG. 7 is a simplified block diagram of a named entity recognition (NER) model training system according to certain embodiments.

The post-processing subsystem 170 is configured to perform certain processing on the text including all of the entity values and output the final text, e.g., a collection of final sentences. The final text may be used for the training of the NER model. An example of an NER model training system 700 is shown in FIG. 7.

In certain implementations, the post-processing subsystem 170 subjects the generated text to the context correction. For example, post-processing subsystem 170 may include a context corrector 171 that corrects grammar and/or context of the sentences. For example, the context corrector 171 includes a machine learning model that is trained to correct grammar and/or context of the sentences.

In some embodiments, the context corrector 171 can be omitted and the sentences may be provided to the grammar correction subsystem 130 that can use the context correction model 131 to correct the grammar and/or context of the sentences.

The post-processing subsystem 170 may also subject the generated text to the review of the similarity with the previously generated text. For example, in the course of the natural language text generation, three paragraphs were generated prior to the currently generated paragraph. The post-processing subsystem 170 compares the currently generated text to three paragraphs previously generated to make sure that the new paragraph is not similar to the previously generated three paragraphs. For example, the post-processing subsystem 170 may further include a third filter 172. The third filter 172 may receive the corrected sentences from the context corrector 171 and filter out paragraphs including sentences that do not meet a predetermined metric, e.g., a cross-encoder score. The cross-encoder metric is described above.

In some embodiments, to further increase diversity of the texts, the third filter 172 may include a machine learning model, e.g., a cross-encoder model that can calculate the cross-encoder score. The cross-encoder model may be the same or similar to the machine learning model used by the first filter 123.

In certain implementations, the third filter 172 extracts the sentences having the cross-encoder score less than or equal to a predetermined similarity threshold, e.g., 50%. Also, the third filter 172 may filter out, e.g., exclude, the paragraphs having the sentences with the cross-encoder score greater than the predetermined similarity threshold, e.g., 50%.

The cross-encoder score less than or equal to 50% signifies that the final text is at most 50% similar to the previously generated sentences. The value is determined upon performing Exploratory Data Analysis (EDA) on the available gold standard or seed data for the similarity between paragraphs.

After the filtering performed by the post-processing subsystem 170, the final text can be output.

Examples of the final text generated by EFNLG subsystem 104 are shown in Table 4 below.

TABLE 4

| Entity list | Generated Fake Values | Final Text Output |
| --- | --- | --- |
| ['DATE_TIME', 'DATE_TIME', 'DATE_TIME', 'ADDRESS', 'PERSON'] | ['Sunday', '16:51:53', '21:59 PM-Dec. 16, 2005', '14475 Todd Springs, North Megan, ME 09095', 'Stephanie Black'] | Hello, on Sunday, I was in a car accident at 16:51:53. I'm not sure what happened but it was the fault of the driver and I have no idea where to go. Anyway, I would like to make an appointment |

TABLE 4-continued

| Entity list | Generated Fake Values | Final Text Output |
|---|---|---|
| | | with you for 21:59 PM-Dec. 16, 2005. My address is 14475 Todd Springs, North Megan, ME 09095. Please let me know if you need anything else. Kind regards, Stephanie Black. |
| ['PERSON', 'DATE_TIME', 'CREDIT_DEBIT_NUMBER'] | ['Kyle Butler', '06:21 AM-Oct. 25, 2018', '1800-0154-1559-365'] | Kyle Butler, why did I get a notice from the bank that our new joint debit card had the wrong expiration date of 06:21 AM-Oct. 25, 2018? The correct card number is 1800-0154-1559-365. |
| ['PERSON', 'DATE_TIME', 'BANK_ACCOUNT_NUMBER'] | ['Jason Bennett', '20:09:04', 'FVCZ63560988393276'] | Jason Bennett, when you go to the bank to get a new checking account set up at 20:09:04, just make damn sure to use FVCZ63560988393276. |
| ['SSN'] | ['115-21-6536'] | I'm really glad I found this car dealership. Everyone has been so nice and helpful. I also feel like I got a very great deal on the car. I brought along my social security number for the final credit card check. The number is 115-21-6536. Please let me know if something doesn't go through! |
| ['PERSON', 'PERSON', 'SSN'] | ['Sarah Fleming', 'Kristin Harmon', '115-21-6536'] | Sarah Fleming, congratulations on your new upcoming wedding! I also understand you're very excited that you are going to choose us as your personal wedding photographer. We would love for you to pick out a professional photographer from our group. By the way, Kristin Harmon's social security number is 115-21-6536. Let me know if you have any further questions. |
| ['SSN'] | ['115-21-6536'] | If my social security number is 115-21-6536, will my children have numbers close in sequence to mine? |

Figure 4:
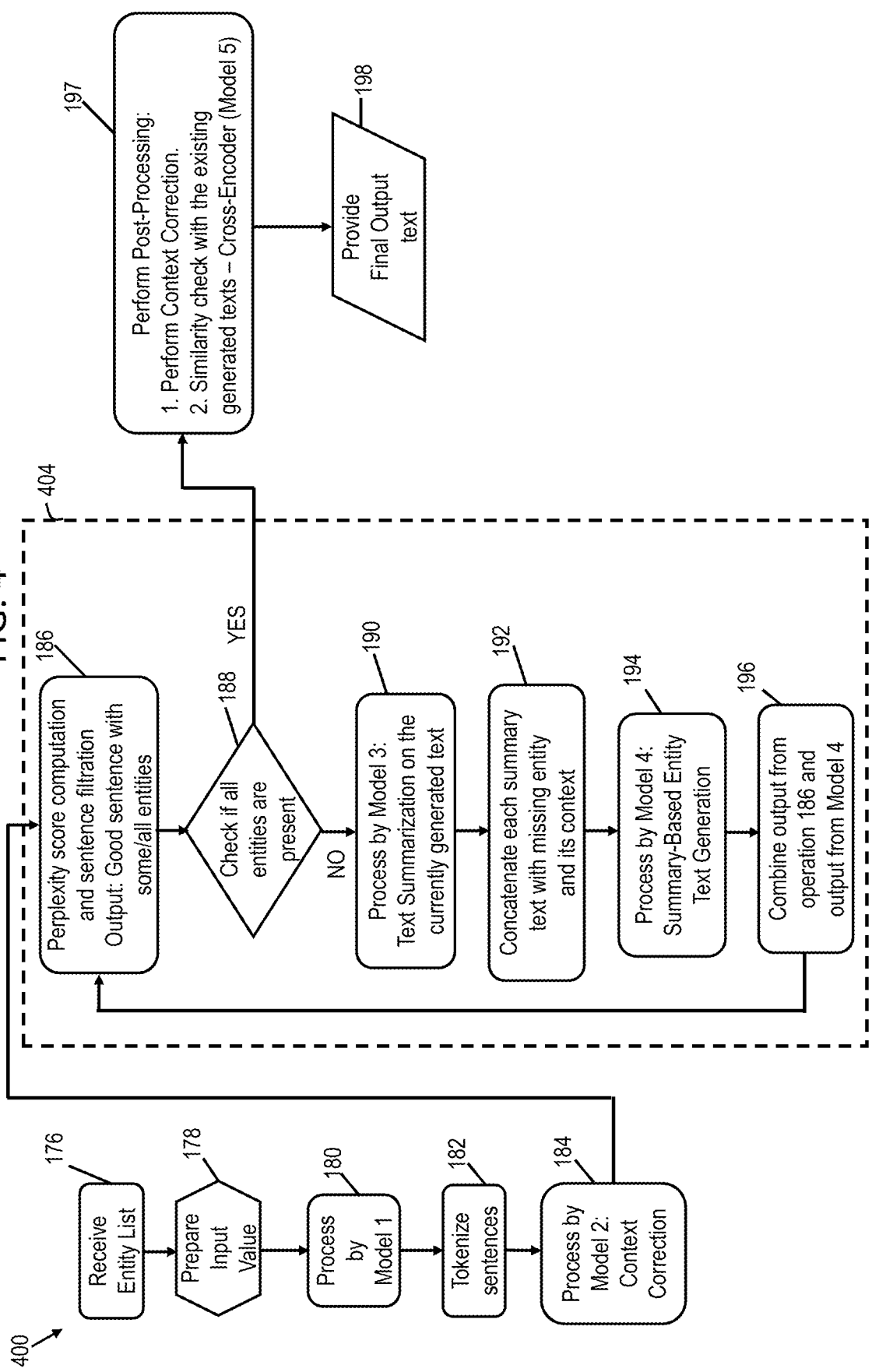
FIG. 4 depicts processing performed by the natural language generation system according to various embodiments.

FIG. 4 depicts processing according to various embodiments. For example, the processing 400 depicted in FIG. 4 may be performed by some or all of the data processing subsystem 103, the EFNLG subsystem 104, and the NLG model 115.

The processing depicted in FIG. 4 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 4 and described below is intended to be illustrative and non-limiting. Although FIG. 4 depicts the various processing operations occurring in a particular sequence or order, this is not intended to be limiting. In certain alternative embodiments, the processing 400 may be performed in some different order or some operations may be performed at least partially in parallel.

With continuing reference to FIG. 4, at operation 176, the EFNLG subsystem 104 may receive the entity list 148 that may be provided by a user, through the UI subsystem 106.

At operation 178, the EFNLG subsystem 104 may prepare an input value based on the entity list 148.

At operation 180, the input value may be provided to be processed by model 1 that corresponds to the NLG model 115. After the processing performed by the NLG model 115, the text including one or more entity values corresponding to one or more entities from the entity list 148 may be generated and output.

At operation 182, the tokenizer 152 may tokenize the sentences of the text output by the NLG model 115.

At operation 184, the context of the tokenized sentences may be corrected by model 2 that corresponds to the context corrector 153, e.g., the context correction model 131.

At operation 186, the second filter 154 may calculate a perplexity score and exclude, e.g., filter out, the sentences whose perplexity score is equal to or greater than 35%. The output of the second filter 154 are good sentences, e.g., the sentences that likely will not "perplex" the model.

At operation 188, the entity checker 156 may check (e.g., detect or determine) if all entity values corresponding to all entities provided on the entity list 148 are present in the sentences output by the second filter 154. For example, the entity checker 156 creates a list of missing entity values based on the determination.

If all entity values corresponding to the entities provided on the entity list 148 are present in the sentences output by the second filter 154 (YES at operation 188), the processing proceeds to operation 197 for post-processing.

If not all of the entity values corresponding to the entities provided on the entity list 148 are present in the sentences output from the second filter 154 (NO at operation 188), the processing 400 proceeds to operation 190.

At operation 190, the sentences are provided as an input for processing by model 3, e.g., the text summarization model 160. The text summarization model 160 summarizes the sentences and outputs the text summary of the provided sentences, e.g., the text summary of the currently generated text.

At operation 192, the first combiner 162 concatenates a missing entity value from the list of missing entity values determined by the entity checker 156, with the text summary output by the text summarization model 160.

At operation 194, an output of the first combiner 162 is provided as an input to model 4, e.g., the next sentence generation model 164. The next sentence generation model 164 generates one or more sentences by taking into consideration the context of the text summary output by the text summarization model 160 so that the sentence includes the missing entity value.

At operation 196, the second combiner 166 combines the text, which is output by the second filter 154 in operation 186, with the sentence generated by the next sentence generation model 164. For example, the second combiner 166 appends the sentence as the next sentence at the end of the text output by the second filter 154.

The processing then returns to operation 186 for calculation of the perplexity score and filtering.

Afterwards, the operation 188 is performed again. If it is determined one or more missing entity values remain on the list of missing entity values, the operations 190 to 188 are repeated for a next missing entity value. For example, the natural language generation system 98 performs iterative processing 404 until no missing entity value remains on the list of missing entity values.

If no missing entity value remains on the list of missing entity values, the processing 400 proceeds to operation 197.

At operation 197, the post-processing subsystem 170 performs post-processing using, for example, the context correction model 131 and the third filter 172, as described above. At operation 198, the EFNLG subsystem 104 provides a final output text.

III. Training and Deployment

Figure 5:
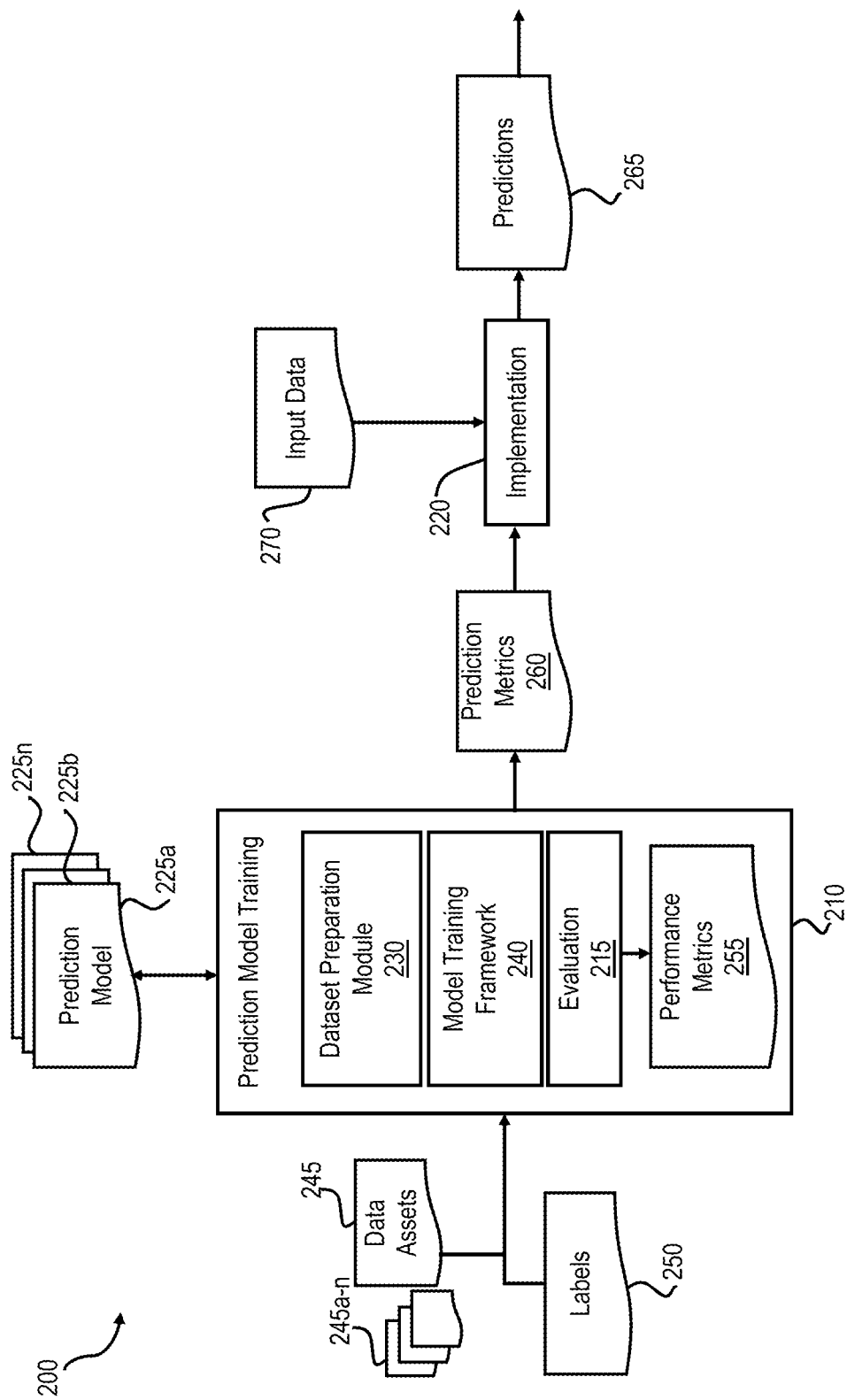
FIG. 5 depicts a block diagram of a prediction model training and deployment system in accordance with various embodiments.

FIG. 5 is a block diagram illustrating a machine-learning system 200 in accordance with various embodiments. For example, the machine-learning system 200 may be a part of the natural language generation system 98 or may be in communication with the natural language generation system 98, to facilitate the training of the models.

As shown in FIG. 5, the machine-learning system 200 includes various stages: a prediction model training stage 210 to build and train models, an evaluation stage 215 to evaluate performance of trained models, and an implementation stage 220 for implementing one or more models. The prediction model training stage 210 builds and trains one or more prediction models 225a and 225b to 225n ('n' represents any natural number) to be used by the other stages (which may be referred to herein individually as a prediction model 225 or collectively as the prediction models 225). For example, the prediction models 225 can include any machine learning model described above with respect to the natural language generation system 98. Still other types of prediction models may be implemented in other examples according to this disclosure such as named entity recognition modeling and text classification.

A prediction model 225 can be a machine-learning model, of a type of the machine-learning models described above. The natural language generation system 98 may employ the same type of prediction model or different types of prediction models for providing predictions to users. In certain instances, the prediction model 225 performs natural language generation using a fine-tuned T5-based model. Still other types of prediction models may be implemented in other examples according to embodiments.

To train the various prediction models 225, the prediction model training stage 210 includes three main components: dataset preparation module 230, model training framework 240, and evaluation stage 215. The dataset preparation module 230 performs the processes of loading data assets 245 (e.g., the training datasets), splitting the data assets 245 into training and validation sets 245a-n so that the system can train and test the prediction models 225, and pre-processing of data assets 245. The splitting the data assets 245 into training and validation sets 245a-n may be performed randomly (e.g., a 60/40%, 70/30%, etc.).

In some instances, the training data 245a includes the augmented texts and/or embeddings of the augmented texts. The augmented texts and/or embeddings of the augmented texts can be obtained as described in the dataset preparation and enhancement section. The dataset preparation module 230 may standardize the format of the data within the augmented texts and/or embeddings of the augmented texts. In some instances, the training data 245a includes the data within the augmented texts and/or embeddings of the augmented texts and labels 250 corresponding to the data as a matrix or table of values. For example, for each augmented text and/or embedding of the augmented text, an indication of the entities, context, and/or natural language sample (e.g., natural language sentence) to be inferred by the prediction model 225 may be provided as ground truth information for labels 250. The behavior of the prediction model 225 can then be adapted (e.g., through MinMax or ALS optimization or Gradient Descent) to minimize the difference between the generated inferences and the ground truth information.

The model training framework 240 performs the processes of determining hyperparameters for the prediction model 225 and performing iterative operations of inputting examples from the training data 245a into the prediction model 225 to find a set of model parameters (e.g., weights and/or biases) that minimizes a cost function(s) such as loss or error function for the prediction model 225. The hyperparameters are settings that can be tuned or optimized to control the behavior of the prediction model 225. Most models explicitly define hyperparameters that control different features of the models such as memory or cost of execution. However, additional hyperparameters may be defined to adapt the prediction model 225 to a specific scenario as, for example, learning rate, number of iterations, regularization weight or strength, and the like.

The cost function can be constructed to measure the difference between the outputs inferred using the prediction models 225 and the ground truth annotated to the samples using the labels. For example, for a supervised learning based model, the goal of the training is to learn a function "h( )" (also sometimes referred to as the hypothesis function) that maps the training input space X to the target value space Y, h: X→Y, such that h(x) is a good predictor for the corresponding value of y. Various different techniques may be used to learn this hypothesis function. In some techniques, as part of deriving the hypothesis function, the cost or loss function may be defined that measures the difference between the ground truth value for an input and the predicted value for that input. As part of training, techniques such as back propagation, random feedback, Direct Feedback Alignment (DFA), Indirect Feedback Alignment (IFA), Hebbian learning, and the like are used to minimize this cost or loss function.

Once the set of model parameters is identified, the model 225 has been trained and the model training framework 240 performs the additional processes of testing or validation using the subset of testing data 245b (testing or validation dataset). The testing or validation processes includes iterative operations of inputting samples from the subset of testing data 245b into the prediction model 225 using a validation technique such as K-Fold Cross-Validation, Leave-one-out Cross-Validation, Leave-one-group-out Cross-Validation, Nested Cross-Validation, or the like to tune the hyperparameters and ultimately find the optimal set of hyperparameters. Once the optimal set of hyperparameters are obtained, a reserved test dataset from the subset of training data 245a may be input into the prediction model 225 to obtain output (in this example, one or more recognized entities), and the output is evaluated versus ground truth entities using correlation techniques such as Bland-Altman method and the Spearman's rank correlation coefficients. Further, performance metrics 255 may be calculated in evaluation stage 215 such as the error, accuracy, precision, recall, receiver operating characteristic curve (ROC), etc. The performance metrics 255 may be used in the evaluation stage 215 to analyze performance of the prediction model 225.

The prediction model training stage 210 outputs trained models including one or more trained prediction models 260. The one or more trained prediction models 260 may be deployed and used in the implementation stage 220 for providing predictions 265 (e.g., generating natural language text) to users. For example, the trained prediction models 260 may receive input data 270 including a set of entities and provide predictions (or outputs) 265 to a user.

IV. Metrics

1. Model Training

During the training phase of the machine learning model, too many epochs can lead to overfitting of the training dataset, whereas too few epochs may result in an underfit model. Early stopping is a method that allows the user to specify a large number of training epochs and stop training once the model performance stops improving on a hold-out validation dataset.

The training dataset and validation dataset may be divided in a 90-10% ratio (or any other suitable ratio). After each epoch, the validation loss is calculated on the hold-out dataset with a specific patience value past which the training will be stopped.

Patience value refers to the number of epochs without improvement after which training will be early stopped. For example, a threshold of 3 may be set that signifies that the training will stop if there is no improvement in the model for a total of 3 sequential epochs.

The same metric(s) described above may be applied across the models mentioned herein during their training stage:
  NLG model 115
  Next sentence generation model 164
  Context correction model 131
  Text Summarization Model 160

2. Model Evaluation after training

For evaluating the models, e.g., the NLG model 115, the next sentence generation model 164, the context correction model 131, and the text summarization model 160, a Recall-Oriented Understudy for Gisting Evaluation (ROUGE) metric may be used on a test dataset.

ROUGE is a set of metrics for evaluating natural language generation, automatic summarization of texts, and machine translations. It works by comparing a machine-produced text or translation against a set of reference summaries (typically human-produced or gold data).

ROUGE-1: refers to the overlap of unigram (each word) between the generated and source texts.
  ROUGE-2: refers to the overlap of bigram (two words) between the generated and source texts.
  ROUGE-L: refers to a score between a candidate and reference(s). A score close to 0 indicates poor similarity between the candidate and references. A score close to one indicates strong similarity between the candidate and references. If the candidate is identical to one of the reference documents, then score is 1.

The following variants of ROUGE-L may be used:
  a. Sentence Level: refers to the Compute longest common subsequence (LCS) between two pieces of text. Newlines are ignored.
  b. Summary Level (ROUGE-LSUM): Newlines in the text are interpreted as sentence boundaries, and the LCS is computed between each pair of source and generated sentences. Also, a union-LCS may be computed.

V. Method(s)

Figure 6:
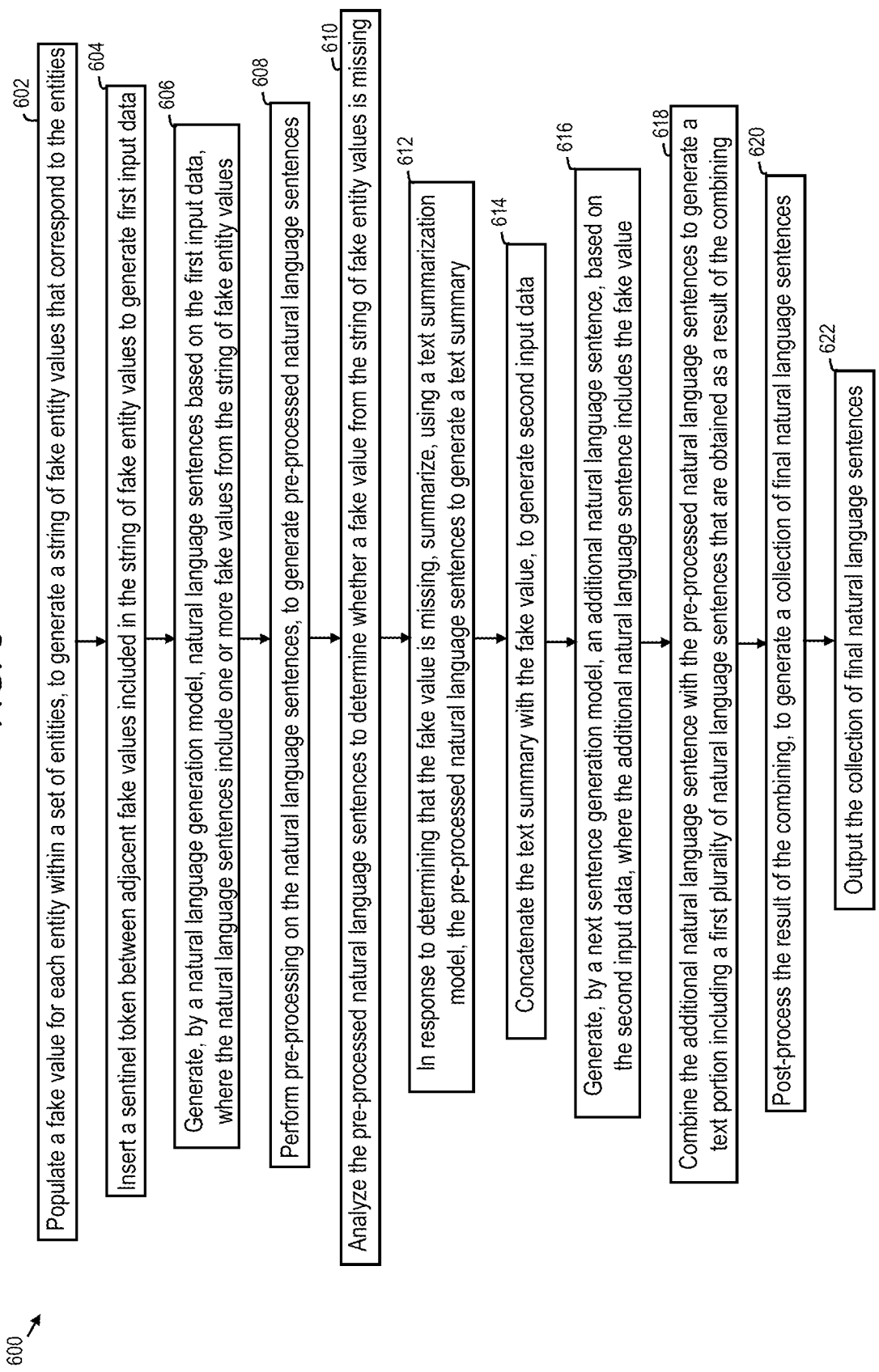
FIG. 6 depicts processing performed by the natural language generation system according to various embodiments.

FIG. 6 depicts processing according to various embodiments. For example, the processing 600 depicted in FIG. 6 may be performed by some or all of the data processing subsystem 103, the EFNLG subsystem 104, and the NLG model 115.

The processing depicted in FIG. 6 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 6 and described below is intended to be illustrative and non-limiting. Although FIG. 6 depicts the various processing operations occurring in a particular sequence or order, this is not intended to be limiting. In certain alternative embodiments, the processing 600 may be performed in some different order or some operations may be performed at least partially in parallel.

The details of the operations performed by the data processing subsystem 103, the EFNLG subsystem 104, and the NLG model 115, as described above with reference to FIGS. 1, 4, and 5, apply to the processing 600 and will not be repeated here.

At operation 602, the natural language generation system 98 may populate a fake value for each entity within a set of entities, to generate a string of fake entity values that correspond to the entities, respectively. The use and generation of fake values is described above in the section entitled Training Dataset Enhancement and the section entitled Entity Focused Natural Language Generation.

At operation 604, the natural language generation system 98 may insert a sentinel token between adjacent fake values included in the string of fake entity values to generate first input data.

At operation 606, the natural language generation system 98 may use the NLG model 115 to generate natural language sentences based on the first input data, where the natural language sentences include one or more fake values from the string of fake entity values.

At operation 608, the natural language generation system 98 may perform pre-processing on the natural language sentences, to generate pre-processed natural language sentences.

In some embodiments, the pre-processing includes tokenizing the natural language sentences into a series of tokens; correcting, using a context correction model, context of the natural language sentences based on the series of tokens to generate corrected natural language sentences; determining a perplexity score for the corrected natural language sentences; and extracting, from the corrected natural language sentences, natural language sentences having the perplexity score of less than a predetermined perplexity threshold.

At operation 610, the natural language generation system 98 may analyze the pre-processed natural language sentences to determine whether a fake value from the string of fake entity values is missing in the pre-processed natural language sentences. For example, in one embodiment, the natural language generation system 98 may extract the fake values from the pre-processed natural language sentences and compare the extracted fake values to the fake values present in the string of fake entity values.

In some embodiments, the natural language generation system 98 may analyze the extracted natural language sentences having the perplexity score of less than the predetermined perplexity threshold. The use and generation of the perplexity score and filtering based on the perplexity score is described above in the section entitled Entity Focused Natural Language Generation.

At operation 612, the natural language generation system 98 may, in response to determining that the fake value is missing, use a text summarization model 160 to summarize the pre-processed natural language sentences to generate a text summary. The operations of the text summarization model 160 are described above in the section entitled Entity Focused Natural Language Generation.

At operation 614, the natural language generation system 98 may concatenate the text summary with the fake value, to generate second input data.

At operation 616, the natural language generation system 98 may use a next sentence generation model 164 to generate an additional natural language sentence, based on the second input data, where the additional natural language sentence includes the fake value. The operations of the next sentence generation model 164 are described above in the section entitled Entity Focused Natural Language Generation.

At operation 618, the natural language generation system 98 may combine the additional natural language sentence with the pre-processed natural language sentences to generate a text portion including a first plurality of natural language sentences that are obtained as a result of the combining.

In some embodiments, after combining the additional natural language sentence with the pre-processed natural language sentences, the natural language generation system 98 may repeat the analyzing and, thereafter, repeat the operations of summarizing, concatenating, generating, and combining, in response to determining that at least one other fake value from the string of fake entity values is missing in the text portion.

At operation 620, the natural language generation system 98 may post-process the result of the combining in operation 618, to generate a collection of final natural language sentences.

In some embodiments, the post-processing includes calculating, using a cross-encoder model, e.g., a third filter 172, a similarity score between the first plurality of natural language sentences included in the text portion and existing natural language sentences; and determining the collection of final natural language sentences to include natural language sentences having the similarity score less than or equal to a predetermined similarity threshold, from the first plurality of natural language sentences.

At operation 622, the natural language generation system 98 may output the collection of final natural language sentences.

In some embodiments, the outputting includes at least one from among transmitting the collection of final natural language sentences to an external device and storing the collection of final natural language sentences in a memory, e.g., the storage subsystem 105. For example, the external device may be connected to the natural language generation system 98 via a network, wirelessly or by wire.

In some embodiments, prior to the post-processing, the natural language generation system 98 may analyze the text portion to determine whether another fake value from the string of fake entity values is missing in the text portion; in response to determining that the other fake value is missing, summarize, using the text summarization model 160, the text portion to generate another text summary; concatenate the other text summary with the other fake value, to generate third input data; generate, by the next sentence generation model 164, a second additional natural language sentence based on the third input data, where the second additional natural language sentence includes the other fake value; and combine the second additional natural language sentence with the text portion, to obtain another text portion including a second plurality of natural language sentences; and use the second plurality of natural language sentences in the post-processing as the result of the combining.

The techniques described herein apply equally to the PII entity data, the key processing entity (KPE) data, the protected health information (PHI) data, etc.

The collection of final natural language sentences may be used for the training of the NER-based model, the model for key-phrase extraction, various protected heath information use cases, etc.

VI. Illustrative Systems

Example Cloud Implementation

Infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 8:
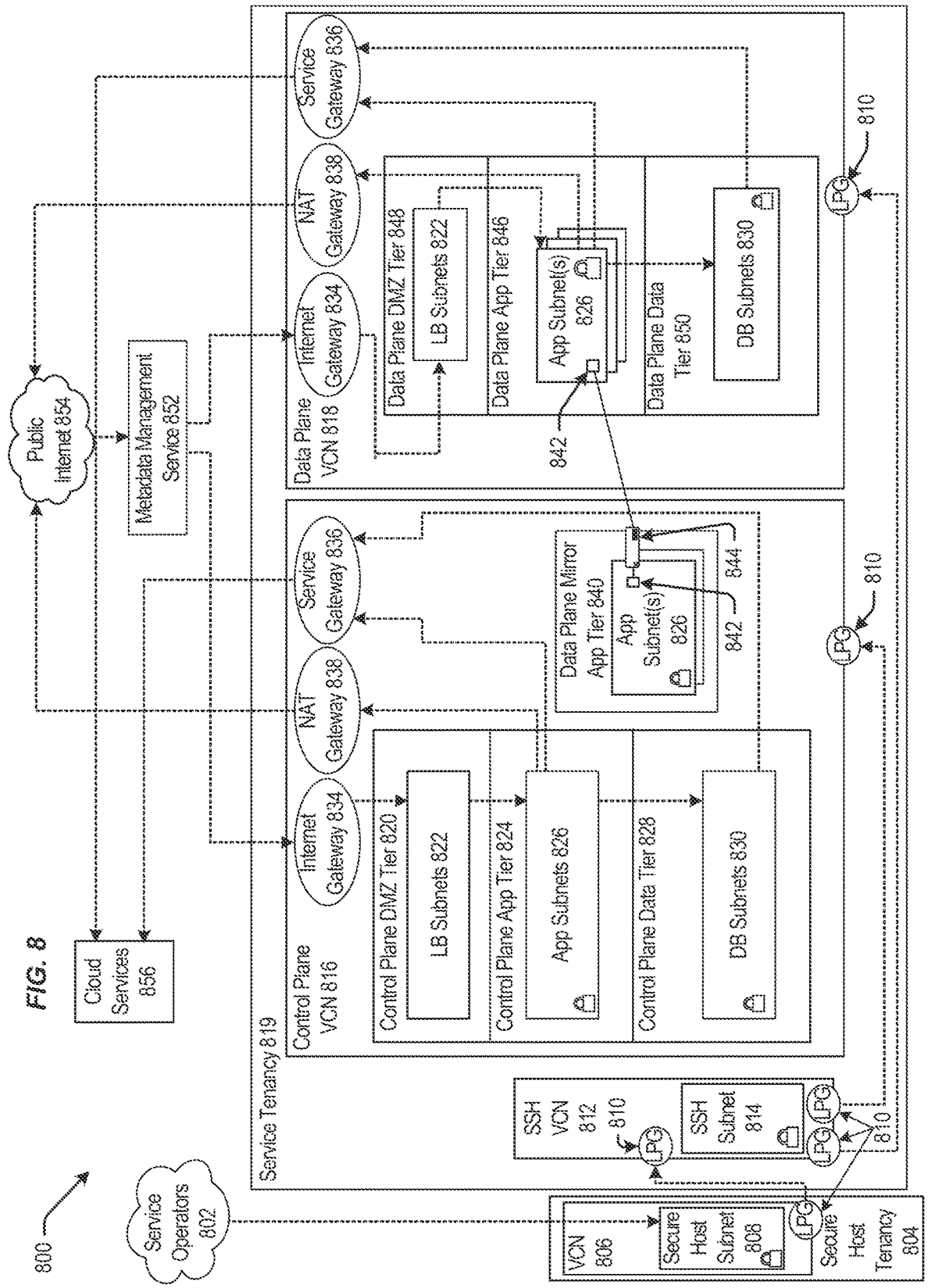
FIG. 8 is a block diagram illustrating one pattern for implementing a cloud infrastructure as a service system, according to at least one embodiment.

FIG. 8 is a block diagram 800 illustrating an example pattern of an IaaS architecture, according to at least one embodiment. Service operators 802 can be communicatively coupled to a secure host tenancy 804 that can include a virtual cloud network (VCN) 806 and a secure host subnet 808. In some examples, the service operators 802 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 806 and/or the Internet.

The VCN 806 can include a local peering gateway (LPG) 810 that can be communicatively coupled to a secure shell (SSH) VCN 812 via an LPG 810 contained in the SSH VCN 812. The SSH VCN 812 can include an SSH subnet 814, and the SSH VCN 812 can be communicatively coupled to a control plane VCN 816 via the LPG 810 contained in the control plane VCN 816. Also, the SSH VCN 812 can be communicatively coupled to a data plane VCN 818 via an LPG 810. The control plane VCN 816 and the data plane VCN 818 can be contained in a service tenancy 819 that can be owned and/or operated by the IaaS provider.

The control plane VCN 816 can include a control plane demilitarized zone (DMZ) tier 820 that acts as a perimeter network (e.g., portions of a corporate network between the corporate intranet and external networks). The DMZ-based servers may have restricted responsibilities and help keep breaches contained. Additionally, the DMZ tier 820 can include one or more load balancer (LB) subnet(s) 822, a control plane app tier 824 that can include app subnet(s) 826, a control plane data tier 828 that can include database (DB) subnet(s) 830 (e.g., frontend DB subnet(s) and/or backend DB subnet(s)). The LB subnet(s) 822 contained in the control plane DMZ tier 820 can be communicatively coupled to the app subnet(s) 826 contained in the control plane app tier 824 and an Internet gateway 834 that can be contained in the control plane VCN 816, and the app subnet(s) 826 can be communicatively coupled to the DB subnet(s) 830 contained in the control plane data tier 828 and a service gateway 836 and a network address translation (NAT) gateway 838. The control plane VCN 816 can include the service gateway 836 and the NAT gateway 838.

The control plane VCN 816 can include a data plane mirror app tier 840 that can include app subnet(s) 826. The app subnet(s) 826 contained in the data plane mirror app tier 840 can include a virtual network interface controller (VNIC) 842 that can execute a compute instance 844. The compute instance 844 can communicatively couple the app subnet(s) 826 of the data plane mirror app tier 840 to app subnet(s) 826 that can be contained in a data plane app tier 846.

The data plane VCN 818 can include the data plane app tier 846, a data plane DMZ tier 848, and a data plane data tier 850. The data plane DMZ tier 848 can include LB subnet(s) 822 that can be communicatively coupled to the app subnet(s) 826 of the data plane app tier 846 and the Internet gateway 834 of the data plane VCN 818. The app subnet(s) 826 can be communicatively coupled to the service gateway 836 of the data plane VCN 818 and the NAT gateway 838 of the data plane VCN 818. The data plane data tier 850 can also include the DB subnet(s) 830 that can be communicatively coupled to the app subnet(s) 826 of the data plane app tier 846.

The Internet gateway 834 of the control plane VCN 816 and of the data plane VCN 818 can be communicatively coupled to a metadata management service 852 that can be communicatively coupled to public Internet 854. Public Internet 854 can be communicatively coupled to the NAT gateway 838 of the control plane VCN 816 and of the data plane VCN 818. The service gateway 836 of the control plane VCN 816 and of the data plane VCN 818 can be communicatively couple to cloud services 856.

In some examples, the service gateway 836 of the control plane VCN 816 or of the data plane VCN 818 can make application programming interface (API) calls to cloud services 856 without going through public Internet 854. The API calls to cloud services 856 from the service gateway 836 can be one-way: the service gateway 836 can make API calls to cloud services 856, and cloud services 856 can send requested data to the service gateway 836. But, cloud services 856 may not initiate API calls to the service gateway 836.

In some examples, the secure host tenancy 804 can be directly connected to the service tenancy 819, which may be otherwise isolated. The secure host subnet 808 can communicate with the SSH subnet 814 through an LPG 810 that may enable two-way communication over an otherwise isolated system. Connecting the secure host subnet 808 to the SSH subnet 814 may give the secure host subnet 808 access to other entities within the service tenancy 819.

The control plane VCN 816 may allow users of the service tenancy 819 to set up or otherwise provision desired resources. Desired resources provisioned in the control plane VCN 816 may be deployed or otherwise used in the data plane VCN 818. In some examples, the control plane VCN 816 can be isolated from the data plane VCN 818, and the data plane mirror app tier 840 of the control plane VCN 816 can communicate with the data plane app tier 846 of the data plane VCN 818 via VNICs 842 that can be contained in the data plane mirror app tier 840 and the data plane app tier 846.

In some examples, users of the system, or customers, can make requests, for example create, read, update, or delete (CRUD) operations, through public Internet 854 that can communicate the requests to the metadata management service 852. The metadata management service 852 can communicate the request to the control plane VCN 816 through the Internet gateway 834. The request can be received by the LB subnet(s) 822 contained in the control plane DMZ tier 820. The LB subnet(s) 822 may determine that the request is valid, and in response to this determination, the LB subnet(s) 822 can transmit the request to app subnet(s) 826 contained in the control plane app tier 824. If the request is validated and requires a call to public Internet 854, the call to public Internet 854 may be transmitted to the NAT gateway 838 that can make the call to public Internet 854. Metadata that may be desired to be stored by the request can be stored in the DB subnet(s) 830.

In some examples, the data plane mirror app tier 840 can facilitate direct communication between the control plane VCN 816 and the data plane VCN 818. For example, changes, updates, or other suitable modifications to configuration may be desired to be applied to the resources contained in the data plane VCN 818. Via a VNIC 842, the control plane VCN 816 can directly communicate with, and can thereby execute the changes, updates, or other suitable modifications to configuration to, resources contained in the data plane VCN 818.

In some embodiments, the control plane VCN 816 and the data plane VCN 818 can be contained in the service tenancy 819. In this case, the user, or the customer, of the system may not own or operate either the control plane VCN 816 or the data plane VCN 818. Instead, the IaaS provider may own or operate the control plane VCN 816 and the data plane VCN 818, both of which may be contained in the service tenancy 819. This embodiment can enable isolation of networks that may prevent users or customers from interacting with other users', or other customers' resources. Also, this embodiment may allow users or customers of the system to store databases privately without needing to rely on public Internet 854, which may not have a desired level of threat prevention, for storage.

In other embodiments, the LB subnet(s) 822 contained in the control plane VCN 816 can be configured to receive a signal from the service gateway 836. In this embodiment, the control plane VCN 816 and the data plane VCN 818 may be configured to be called by a customer of the IaaS provider without calling public Internet 854. Customers of the IaaS provider may desire this embodiment since database(s) that the customers use may be controlled by the IaaS provider and may be stored on the service tenancy 819, which may be isolated from public Internet 854.

Figure 9:
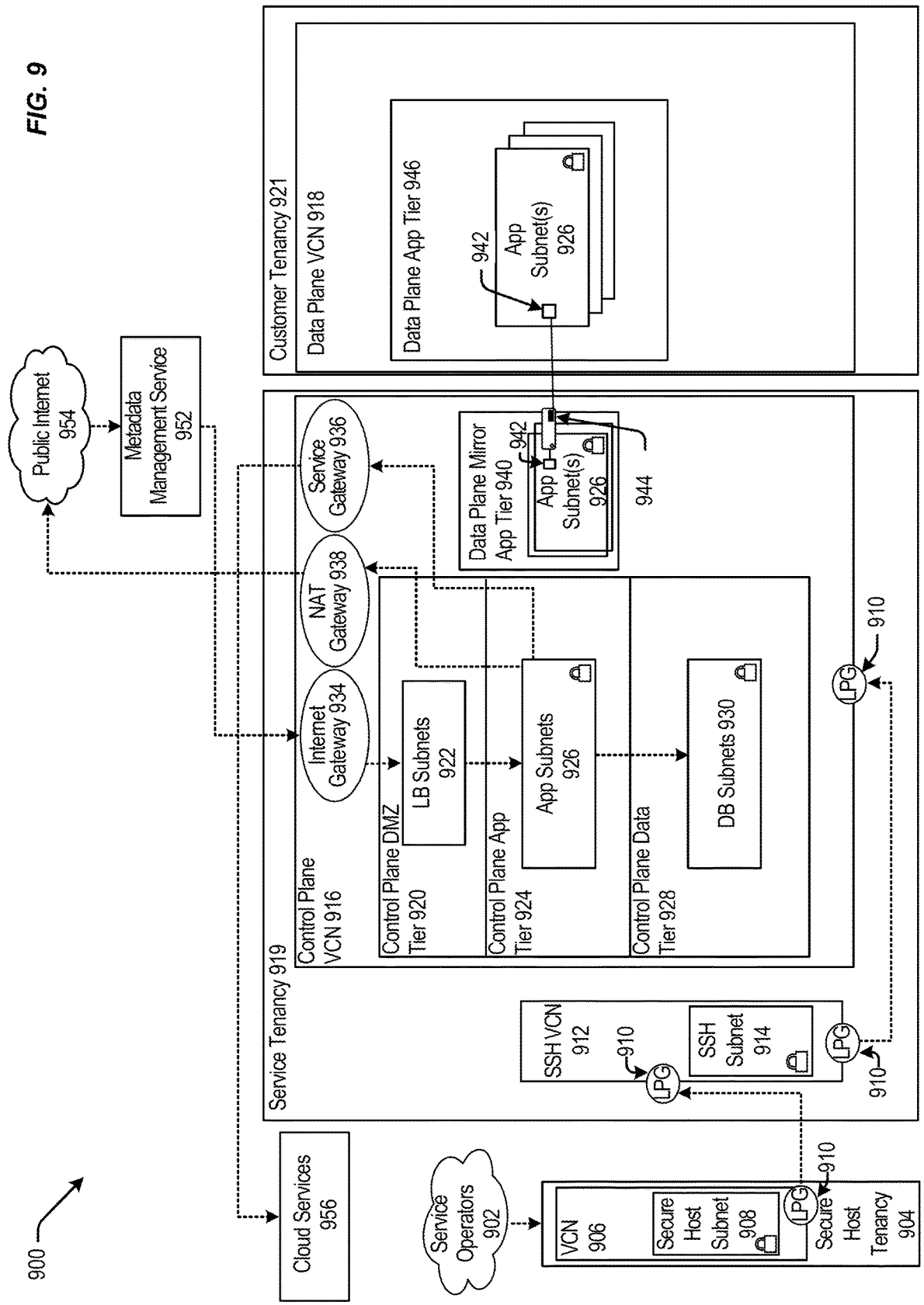
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g., service operators 802 of FIG. 8) can be communicatively coupled to a secure host tenancy 904 (e.g., the secure host tenancy 804 of FIG. 8) that can include a virtual cloud network (VCN) 906 (e.g., the VCN 806 of FIG. 8) and a secure host subnet 908 (e.g., the secure host subnet 808 of FIG. 8). The VCN 906 can include a local peering gateway (LPG) 910 (e.g., the LPG 810 of FIG. 8) that can be communicatively coupled to a secure shell (SSH) VCN 912 (e.g., the SSH VCN 812 of FIG. 8) via an LPG 810 contained in the SSH VCN 912. The SSH VCN 912 can include an SSH subnet 914 (e.g., the SSH subnet 814 of FIG. 8), and the SSH VCN 912 can be communicatively coupled to a control plane VCN 916 (e.g., the control plane VCN 816 of FIG. 8) via an LPG 910 contained in the control plane VCN 916. The control plane VCN 916 can be contained in a service tenancy 919 (e.g., the service tenancy 819 of FIG. 8), and the data plane VCN 918 (e.g., the data plane VCN 818 of FIG. 8) can be contained in a customer tenancy 921 that may be owned or operated by users, or customers, of the system.

The control plane VCN 916 can include a control plane DMZ tier 920 (e.g., the control plane DMZ tier 820 of FIG. 8) that can include LB subnet(s) 922 (e.g., LB subnet(s) 822 of FIG. 8), a control plane app tier 924 (e.g., the control plane app tier 824 of FIG. 8) that can include app subnet(s) 926 (e.g., app subnet(s) 826 of FIG. 8), a control plane data tier 928 (e.g., the control plane data tier 828 of FIG. 8) that can include database (DB) subnet(s) 930 (e.g., similar to DB subnet(s) 830 of FIG. 8). The LB subnet(s) 922 contained in the control plane DMZ tier 920 can be communicatively coupled to the app subnet(s) 926 contained in the control plane app tier 924 and an Internet gateway 934 (e.g., the Internet gateway 834 of FIG. 8) that can be contained in the control plane VCN 916, and the app subnet(s) 926 can be communicatively coupled to the DB subnet(s) 930 contained in the control plane data tier 928 and a service gateway 936 (e.g., the service gateway 836 of FIG. 8) and a network address translation (NAT) gateway 938 (e.g., the NAT gateway 838 of FIG. 8). The control plane VCN 916 can include the service gateway 936 and the NAT gateway 938.

The control plane VCN 916 can include a data plane mirror app tier 940 (e.g., the data plane mirror app tier 840 of FIG. 8) that can include app subnet(s) 926. The app subnet(s) 926 contained in the data plane mirror app tier 940 can include a virtual network interface controller (VNIC) 942 (e.g., the VNIC of 842) that can execute a compute instance 944 (e.g., similar to the compute instance 844 of FIG. 8). The compute instance 944 can facilitate communication between the app subnet(s) 926 of the data plane mirror app tier 940 and the app subnet(s) 926 that can be contained in a data plane app tier 946 (e.g., the data plane app tier 846 of FIG. 8) via the VNIC 942 contained in the data plane mirror app tier 940 and the VNIC 942 contained in the data plane app tier 946.

The Internet gateway 934 contained in the control plane VCN 916 can be communicatively coupled to a metadata management service 952 (e.g., the metadata management service 852 of FIG. 8) that can be communicatively coupled to public Internet 954 (e.g., public Internet 854 of FIG. 8). Public Internet 954 can be communicatively coupled to the NAT gateway 938 contained in the control plane VCN 916. The service gateway 936 contained in the control plane VCN 916 can be communicatively couple to cloud services 956 (e.g., cloud services 856 of FIG. 8).

In some examples, the data plane VCN 918 can be contained in the customer tenancy 921. In this case, the IaaS provider may provide the control plane VCN 916 for each customer, and the IaaS provider may, for each customer, set up a unique compute instance 944 that is contained in the service tenancy 919. Each compute instance 944 may allow communication between the control plane VCN 916, contained in the service tenancy 919, and the data plane VCN 918 that is contained in the customer tenancy 921. The compute instance 944 may allow resources, that are provisioned in the control plane VCN 916 that is contained in the service tenancy 919, to be deployed or otherwise used in the data plane VCN 918 that is contained in the customer tenancy 921.

In other examples, the customer of the IaaS provider may have databases that live in the customer tenancy 921. In this example, the control plane VCN 916 can include the data plane mirror app tier 940 that can include app subnet(s) 926. The data plane mirror app tier 940 can reside in the data plane VCN 918, but the data plane mirror app tier 940 may not live in the data plane VCN 918. That is, the data plane mirror app tier 940 may have access to the customer tenancy 921, but the data plane mirror app tier 940 may not exist in the data plane VCN 918 or be owned or operated by the customer of the IaaS provider. The data plane mirror app tier 940 may be configured to make calls to the data plane VCN 918 but may not be configured to make calls to any entity contained in the control plane VCN 916. The customer may desire to deploy or otherwise use resources in the data plane VCN 918 that are provisioned in the control plane VCN 916, and the data plane mirror app tier 940 can facilitate the desired deployment, or other usage of resources, of the customer.

In some embodiments, the customer of the IaaS provider can apply filters to the data plane VCN 918. In this embodiment, the customer can determine what the data plane VCN 918 can access, and the customer may restrict access to public Internet 954 from the data plane VCN 918. The IaaS provider may not be able to apply filters or otherwise control access of the data plane VCN 918 to any outside networks or databases. Applying filters and controls by the customer onto the data plane VCN 918, contained in the customer tenancy 921, can help isolate the data plane VCN 918 from other customers and from public Internet 954.

In some embodiments, cloud services 956 can be called by the service gateway 936 to access services that may not exist on public Internet 954, on the control plane VCN 916, or on the data plane VCN 918. The connection between cloud services 956 and the control plane VCN 916 or the data plane VCN 918 may not be live or continuous. Cloud services 956 may exist on a different network owned or operated by the IaaS provider. Cloud services 956 may be configured to receive calls from the service gateway 936 and may be configured to not receive calls from public Internet 954. Some cloud services 956 may be isolated from other cloud services 956, and the control plane VCN 916 may be isolated from cloud services 956 that may not be in the same region as the control plane VCN 916. For example, the control plane VCN 916 may be located in "Region 1," and cloud service "Deployment 8," may be located in Region 1 and in "Region 2." If a call to Deployment 8 is made by the service gateway 936 contained in the control plane VCN 916 located in Region 1, the call may be transmitted to Deployment 8 in Region 1. In this example, the control plane VCN 916, or Deployment 8 in Region 1, may not be communicatively coupled to, or otherwise in communication with, Deployment 8 in Region 2.

Figure 10:
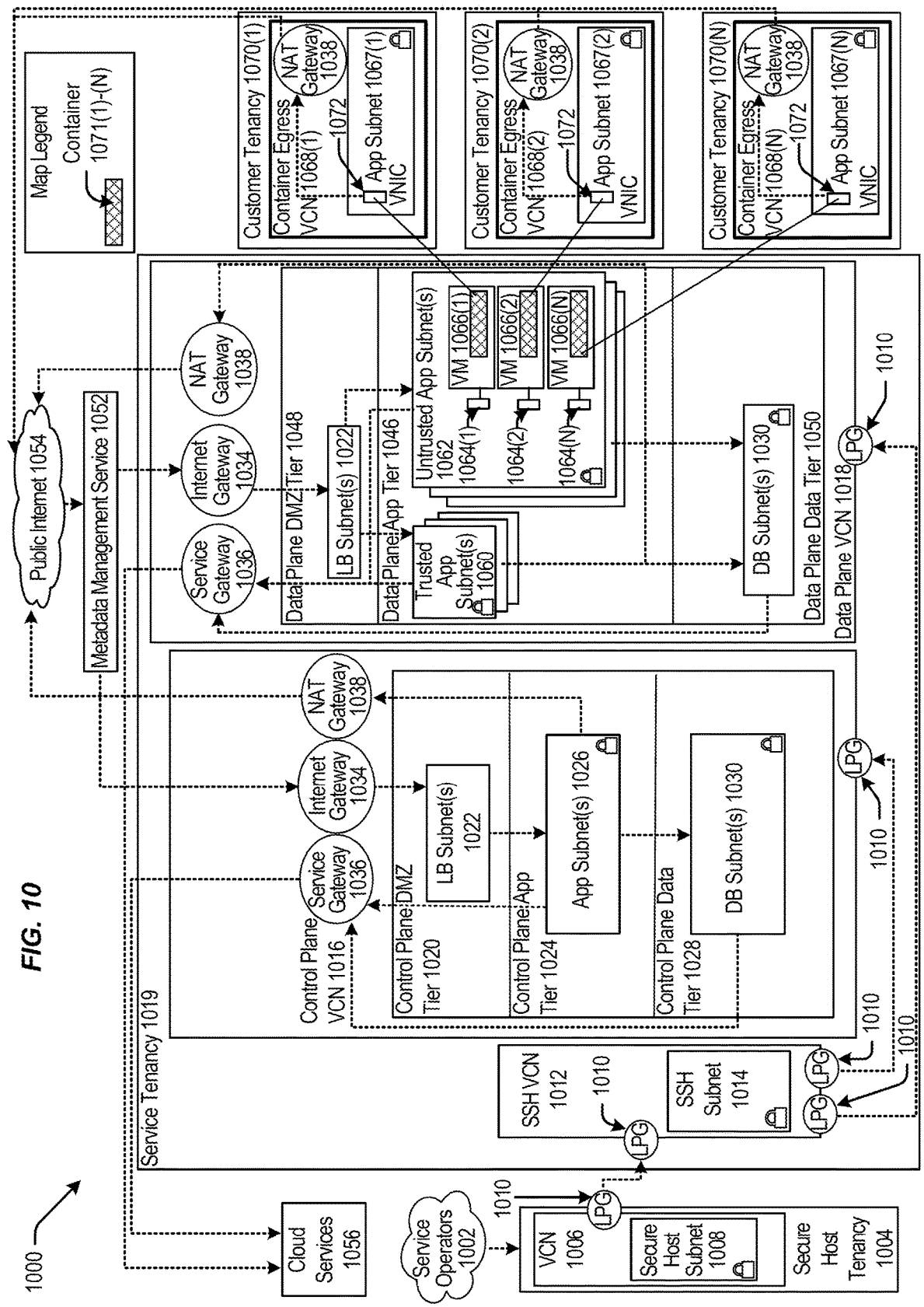
FIG. 10 is a block diagram illustrating another pattern for implementing a cloud infrastructure as a service system, according to at least one embodiment.

FIG. 10 is a block diagram 1000 illustrating another example pattern of an IaaS architecture, according to at least one embodiment. Service operators 1002 (e.g., service operators 802 of FIG. 8) can be communicatively coupled to a secure host tenancy 1004 (e.g., the secure host tenancy 804 of FIG. 8) that can include a virtual cloud network (VCN) 1006 (e.g., the VCN 806 of FIG. 8) and a secure host subnet 1008 (e.g., the secure host subnet 808 of FIG. 8). The VCN 1006 can include an LPG 1010 (e.g., the LPG 810 of FIG. 8) that can be communicatively coupled to an SSH VCN 1012 (e.g., the SSH VCN 812 of FIG. 8) via an LPG 1010 contained in the SSH VCN 1012. The SSH VCN 1012 can include an SSH subnet 1014 (e.g., the SSH subnet 814 of FIG. 8), and the SSH VCN 1012 can be communicatively coupled to a control plane VCN 1016 (e.g., the control plane VCN 816 of FIG. 8) via an LPG 1010 contained in the control plane VCN 1016 and to a data plane VCN 1018 (e.g., the data plane 818 of FIG. 8) via an LPG 1010 contained in the data plane VCN 1018. The control plane VCN 1016 and the data plane VCN 1018 can be contained in a service tenancy 1019 (e.g., the service tenancy 819 of FIG. 8).

The control plane VCN 1016 can include a control plane DMZ tier 1020 (e.g., the control plane DMZ tier 820 of FIG. 8) that can include load balancer (LB) subnet(s) 1022 (e.g., LB subnet(s) 822 of FIG. 8), a control plane app tier 1024 (e.g., the control plane app tier 824 of FIG. 8) that can include app subnet(s) 1026 (e.g., similar to app subnet(s) 826 of FIG. 8), a control plane data tier 1028 (e.g., the control plane data tier 828 of FIG. 8) that can include DB subnet(s) 1030. The LB subnet(s) 1022 contained in the control plane DMZ tier 1020 can be communicatively coupled to the app subnet(s) 1026 contained in the control plane app tier 1024 and to an Internet gateway 1034 (e.g., the Internet gateway 834 of FIG. 8) that can be contained in the control plane VCN 1016, and the app subnet(s) 1026 can be communicatively coupled to the DB subnet(s) 1030 contained in the control plane data tier 1028 and to a service gateway 1036 (e.g., the service gateway of FIG. 8) and a network address translation (NAT) gateway 1038 (e.g., the NAT gateway 838 of FIG. 8). The control plane VCN 1016 can include the service gateway 1036 and the NAT gateway 1038.

The data plane VCN 1018 can include a data plane app tier 1046 (e.g., the data plane app tier 846 of FIG. 8), a data plane DMZ tier 1048 (e.g., the data plane DMZ tier 848 of FIG. 8), and a data plane data tier 1050 (e.g., the data plane data tier 850 of FIG. 8). The data plane DMZ tier 1048 can include LB subnet(s) 1022 that can be communicatively coupled to trusted app subnet(s) 1060 and untrusted app subnet(s) 1062 of the data plane app tier 1046 and the Internet gateway 1034 contained in the data plane VCN 1018. The trusted app subnet(s) 1060 can be communicatively coupled to the service gateway 1036 contained in the data plane VCN 1018, the NAT gateway 1038 contained in the data plane VCN 1018, and DB subnet(s) 1030 contained in the data plane data tier 1050. The untrusted app subnet(s) 1062 can be communicatively coupled to the service gateway 1036 contained in the data plane VCN 1018 and DB subnet(s) 1030 contained in the data plane data tier 1050. The data plane data tier 1050 can include DB subnet(s) 1030 that can be communicatively coupled to the service gateway 1036 contained in the data plane VCN 1018.

The untrusted app subnet(s) 1062 can include one or more primary VNICs 1064(1)-(N) that can be communicatively coupled to tenant virtual machines (VMs) 1066(1)-(N). Each tenant VM 1066(1)-(N) can be communicatively coupled to a respective app subnet 1067(1)-(N) that can be contained in respective container egress VCNs 1068(1)-(N) that can be contained in respective customer tenancies 1070(1)-(N). Respective secondary VNICs 1072(1)-(N) can facilitate communication between the untrusted app subnet(s) 1062 contained in the data plane VCN 1018 and the app subnet contained in the container egress VCNs 1068(1)-(N). Each container egress VCNs 1068(1)-(N) can include a NAT gateway 1038 that can be communicatively coupled to public Internet 1054 (e.g., public Internet 854 of FIG. 8).

The Internet gateway 1034 contained in the control plane VCN 1016 and contained in the data plane VCN 1018 can be communicatively coupled to a metadata management service 1052 (e.g., the metadata management service 852 of FIG. 8) that can be communicatively coupled to public Internet 1054. Public Internet 1054 can be communicatively coupled to the NAT gateway 1038 contained in the control plane VCN 1016 and contained in the data plane VCN 1018. The service gateway 1036 contained in the control plane VCN 1016 and contained in the data plane VCN 1018 can be communicatively couple to cloud services 1056.

In some embodiments, the data plane VCN 1018 can be integrated with customer tenancies 1070. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 1046. Code to run the function may be executed in the VMs 1066(1)-(N), and the code may not be configured to run anywhere else on the data plane VCN 1018. Each VM 1066(1)-(N) may be connected to one customer tenancy 1070. Respective containers 1071(1)-(N) contained in the VMs 1066(1)-(N) may be configured to run the code. In this case, there can be a dual isolation (e.g., the containers 1071(1)-(N) running code, where the containers 1071(1)-(N) may be contained in at least the VM 1066(1)-(N) that are contained in the untrusted app subnet(s) 1062), which may help prevent incorrect or otherwise undesirable code from damaging the network of the IaaS provider or from damaging a network of a different customer. The containers 1071(1)-(N) may be communicatively coupled to the customer tenancy 1070 and may be configured to transmit or receive data from the customer tenancy 1070. The containers 1071(1)-(N) may not be configured to transmit or receive data from any other entity in the data plane VCN 1018. Upon completion of running the code, the IaaS provider may kill or otherwise dispose of the containers 1071(1)-(N).

In some embodiments, the trusted app subnet(s) 1060 may run code that may be owned or operated by the IaaS provider. In this embodiment, the trusted app subnet(s) 1060 may be communicatively coupled to the DB subnet(s) 1030 and be configured to execute CRUD operations in the DB subnet(s) 1030. The untrusted app subnet(s) 1062 may be communicatively coupled to the DB subnet(s) 1030, but in this embodiment, the untrusted app subnet(s) may be configured to execute read operations in the DB subnet(s) 1030. The containers 1071(1)-(N) that can be contained in the VM 1066(1)-(N) of each customer and that may run code from the customer may not be communicatively coupled with the DB subnet(s) 1030.

In other embodiments, the control plane VCN 1016 and the data plane VCN 1018 may not be directly communicatively coupled. In this embodiment, there may be no direct communication between the control plane VCN 1016 and the data plane VCN 1018. However, communication can occur indirectly through at least one method. An LPG 1010 may be established by the IaaS provider that can facilitate communication between the control plane VCN 1016 and the data plane VCN 1018. In another example, the control plane VCN 1016 or the data plane VCN 1018 can make a call to cloud services 1056 via the service gateway 1036. For example, a call to cloud services 1056 from the control plane VCN 1016 can include a request for a service that can communicate with the data plane VCN 1018.

Figure 11:
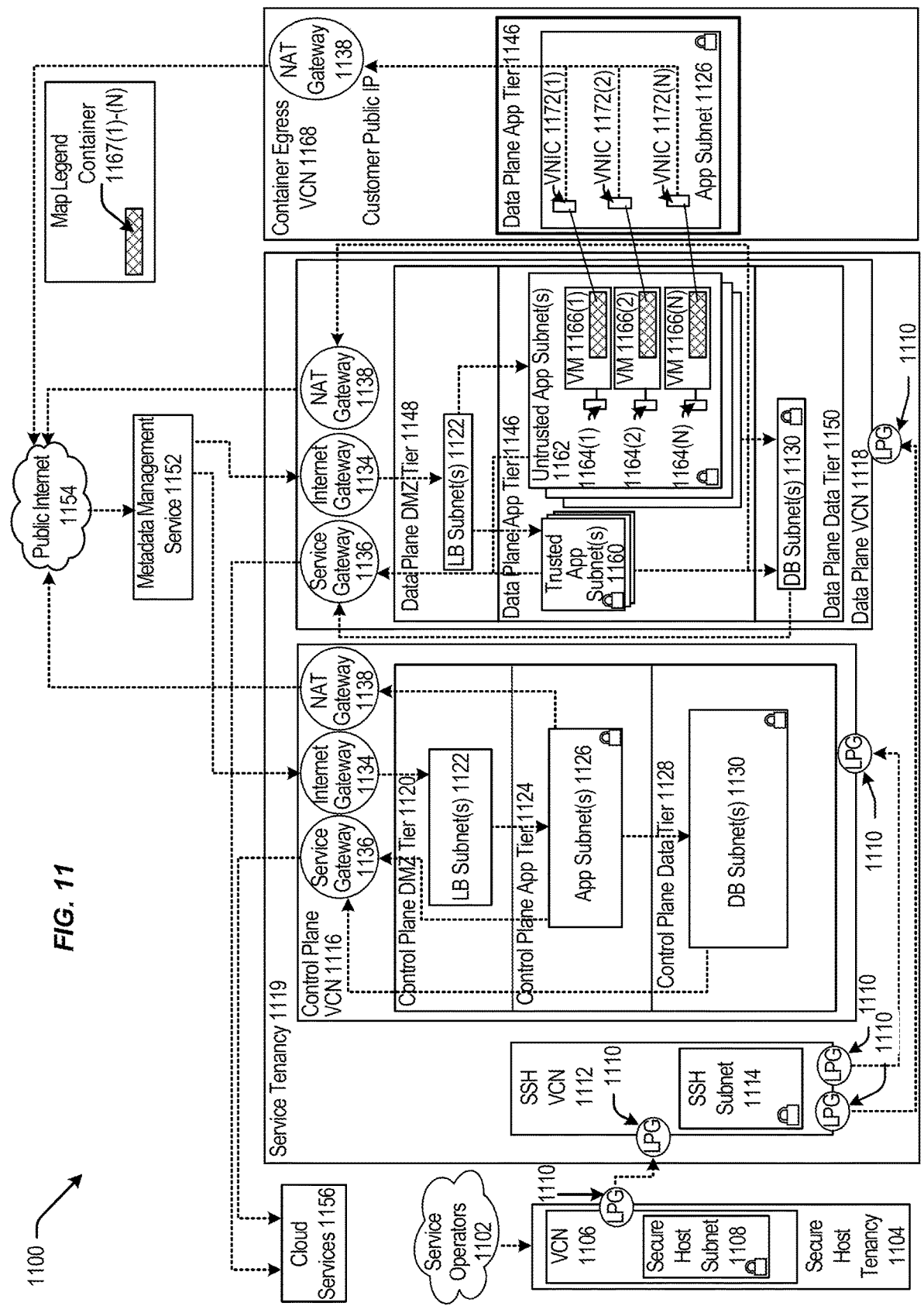
FIG. 11 is a block diagram illustrating another pattern for implementing a cloud infrastructure as a service system, according to at least one embodiment.

FIG. 11 is a block diagram 1100 illustrating another example pattern of an IaaS architecture, according to at least one embodiment. Service operators 1102 (e.g., service operators 802 of FIG. 8) can be communicatively coupled to a secure host tenancy 1104 (e.g., the secure host tenancy 804 of FIG. 8) that can include a virtual cloud network (VCN) 1106 (e.g., the VCN 806 of FIG. 8) and a secure host subnet 1108 (e.g., the secure host subnet 808 of FIG. 8). The VCN 1106 can include an LPG 1110 (e.g., the LPG 810 of FIG. 8) that can be communicatively coupled to an SSH VCN 1112 (e.g., the SSH VCN 812 of FIG. 8) via an LPG 1110 contained in the SSH VCN 1112. The SSH VCN 1112 can include an SSH subnet 1114 (e.g., the SSH subnet 814 of FIG. 8), and the SSH VCN 1112 can be communicatively coupled to a control plane VCN 1116 (e.g., the control plane VCN 816 of FIG. 8) via an LPG 1110 contained in the control plane VCN 1116 and to a data plane VCN 1118 (e.g., the data plane 818 of FIG. 8) via an LPG 1110 contained in the data plane VCN 1118. The control plane VCN 1116 and the data plane VCN 1118 can be contained in a service tenancy 1119 (e.g., the service tenancy 819 of FIG. 8).

The control plane VCN 1116 can include a control plane DMZ tier 1120 (e.g., the control plane DMZ tier 820 of FIG. 8) that can include LB subnet(s) 1122 (e.g., LB subnet(s) 822 of FIG. 8), a control plane app tier 1124 (e.g., the control plane app tier 824 of FIG. 8) that can include app subnet(s) 1126 (e.g., app subnet(s) 826 of FIG. 8), a control plane data tier 1128 (e.g., the control plane data tier 828 of FIG. 8) that can include DB subnet(s) 1130 (e.g., DB subnet(s) 1030 of FIG. 10). The LB subnet(s) 1122 contained in the control plane DMZ tier 1120 can be communicatively coupled to the app subnet(s) 1126 contained in the control plane app tier 1124 and to an Internet gateway 1134 (e.g., the Internet gateway 834 of FIG. 8) that can be contained in the control plane VCN 1116, and the app subnet(s) 1126 can be communicatively coupled to the DB subnet(s) 1130 contained in the control plane data tier 1128 and to a service gateway 1136 (e.g., the service gateway of FIG. 8) and a network address translation (NAT) gateway 1138 (e.g., the NAT gateway 838 of FIG. 8). The control plane VCN 1116 can include the service gateway 1136 and the NAT gateway 1138.

The data plane VCN 1118 can include a data plane app tier 1146 (e.g., the data plane app tier 846 of FIG. 8), a data plane DMZ tier 1148 (e.g., the data plane DMZ tier 848 of FIG. 8), and a data plane data tier 1150 (e.g., the data plane data tier 850 of FIG. 8). The data plane DMZ tier 1148 can include LB subnet(s) 1122 that can be communicatively coupled to trusted app subnet(s) 1160 (e.g., trusted app subnet(s) 1060 of FIG. 10) and untrusted app subnet(s) 1162 (e.g., untrusted app subnet(s) 1062 of FIG. 10) of the data plane app tier 1146 and the Internet gateway 1134 contained in the data plane VCN 1118. The trusted app subnet(s) 1160 can be communicatively coupled to the service gateway 1136 contained in the data plane VCN 1118, the NAT gateway 1138 contained in the data plane VCN 1118, and DB subnet(s) 1130 contained in the data plane data tier 1150. The untrusted app subnet(s) 1162 can be communicatively coupled to the service gateway 1136 contained in the data plane VCN 1118 and DB subnet(s) 1130 contained in the data plane data tier 1150. The data plane data tier 1150 can include DB subnet(s) 1130 that can be communicatively coupled to the service gateway 1136 contained in the data plane VCN 1118.

The untrusted app subnet(s) 1162 can include primary VNICs 1164(1)-(N) that can be communicatively coupled to tenant virtual machines (VMs) 1166(1)-(N) residing within the untrusted app subnet(s) 1162. Each tenant VM 1166(1)-(N) can run code in a respective container 1167(1)-(N), and be communicatively coupled to an app subnet 1126 that can be contained in a data plane app tier 1146 that can be contained in a container egress VCN 1168. Respective secondary VNICs 1172(1)-(N) can facilitate communication between the untrusted app subnet(s) 1162 contained in the data plane VCN 1118 and the app subnet contained in the container egress VCN 1168. The container egress VCN can include a NAT gateway 1138 that can be communicatively coupled to public Internet 1154 (e.g., public Internet 854 of FIG. 8).

The Internet gateway 1134 contained in the control plane VCN 1116 and contained in the data plane VCN 1118 can be communicatively coupled to a metadata management service 1152 (e.g., the metadata management service 852 of FIG. 8) that can be communicatively coupled to public Internet 1154. Public Internet 1154 can be communicatively coupled to the NAT gateway 1138 contained in the control plane VCN 1116 and contained in the data plane VCN 1118. The service gateway 1136 contained in the control plane VCN 1116 and contained in the data plane VCN 1118 can be communicatively couple to cloud services 1156.

In some examples, the pattern illustrated by the architecture of block diagram 1100 of FIG. 11 may be considered an exception to the pattern illustrated by the architecture of block diagram 1000 of FIG. 10 and may be desirable for a customer of the IaaS provider if the IaaS provider cannot directly communicate with the customer (e.g., a disconnected region). The respective containers 1167(1)-(N) that are contained in the VMs 1166(1)-(N) for each customer can be accessed in real-time by the customer. The containers 1167(1)-(N) may be configured to make calls to respective secondary VNICs 1172(1)-(N) contained in app subnet(s) 1126 of the data plane app tier 1146 that can be contained in the container egress VCN 1168. The secondary VNICs 1172(1)-(N) can transmit the calls to the NAT gateway 1138 that may transmit the calls to public Internet 1154. In this example, the containers 1167(1)-(N) that can be accessed in real-time by the customer can be isolated from the control plane VCN 1116 and can be isolated from other entities contained in the data plane VCN 1118. The containers 1167(1)-(N) may also be isolated from resources from other customers.

In other examples, the customer can use the containers 1167(1)-(N) to call cloud services 1156. In this example, the customer may run code in the containers 1167(1)-(N) that requests a service from cloud services 1156. The containers 1167(1)-(N) can transmit this request to the secondary VNICs 1172(1)-(N) that can transmit the request to the NAT gateway that can transmit the request to public Internet 1154. Public Internet 1154 can transmit the request to LB subnet(s) 1122 contained in the control plane VCN 1116 via the Internet gateway 1134. In response to determining the request is valid, the LB subnet(s) can transmit the request to app subnet(s) 1126 that can transmit the request to cloud services 1156 via the service gateway 1136.

It should be appreciated that IaaS architectures 800, 900, 1000, 1100 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

FIG. 12 illustrates an example computer system 1200, in which various embodiments may be implemented. The computer system 1200 may be used to implement any of the computer systems described above. As shown in the figure, computer system 1200 includes a processing unit 1204 that communicates with a number of peripheral subsystems via a bus subsystem 1202. These peripheral subsystems may include a processing acceleration unit 1206, an I/O subsystem 1208, a storage subsystem 1218 and a communications subsystem 1224. Storage subsystem 1218 includes tangible computer-readable storage media 1222 and a system memory 1210.

Bus subsystem 1202 provides a mechanism for letting the various components and subsystems of computer system 1200 communicate with each other as intended. Although bus subsystem 1202 is shown schematically as a single bus, alternative embodiments of the bus subsystem may utilize multiple buses. Bus subsystem 1202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1204, which can be implemented as one or more integrated circuits (e.g., a conventional microprocessor or microcontroller), controls the operation of computer system 1200. One or more processors may be included in processing unit 1204. These processors may include single core or multicore processors. In certain embodiments, processing unit 1204 may be implemented as one or more independent processing units 1232 and/or 1234 with single or multicore processors included in each processing unit. In other embodiments, processing unit 1204 may also be implemented as a quad-core processing unit formed by integrating two dual-core processors into a single chip.

In various embodiments, processing unit 1204 can execute a variety of programs in response to program code and can maintain multiple concurrently executing programs or processes. At any given time, some or all of the program code to be executed can be resident in processor(s) 1204 and/or in storage subsystem 1218. Through suitable programming, processor(s) 1204 can provide various functionalities described above. Computer system 1200 may additionally include a processing acceleration unit 1206, which can include a digital signal processor (DSP), a special-purpose processor, and/or the like.

I/O subsystem 1208 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1200 may include a storage subsystem 1218 that includes software elements, shown as being currently located within a system memory 1210. System memory 1210 may store program instructions that are loadable and executable on processing unit 1204, as well as data generated during the execution of these programs.

Depending on the configuration and type of computer system 1200, system memory 1210 may be volatile (such as random access memory (RAM)) and/or non-volatile (such as read-only memory (ROM), flash memory, etc.) The RAM typically contains data and/or program services that are immediately accessible to and/or presently being operated and executed by processing unit 1204. In some implementations, system memory 1210 may include multiple different types of memory, such as static random access memory (SRAM) or dynamic random access memory (DRAM). In some implementations, a basic input/output system (BIOS), containing the basic routines that help to transfer information between elements within computer system 1200, such as during start-up, may typically be stored in the ROM. By way of example, and not limitation, system memory 1210 also illustrates application programs 1212, which may include client applications, Web browsers, mid-tier applications, relational database management systems (RDBMS), etc., program data 1214, and an operating system 1216. By way of example, operating system 1216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems.

Storage subsystem 1218 may also provide a tangible computer-readable storage medium for storing the basic programming and data constructs that provide the functionality of some embodiments. Software (programs, code services, instructions) that when executed by a processor provide the functionality described above may be stored in storage subsystem 1218. These software services or instructions may be executed by processing unit 1204. Storage subsystem 1218 may also provide a repository for storing data used in accordance with the present disclosure.

Storage subsystem 1218 may also include a computer-readable storage media reader 1220 that can further be connected to computer-readable storage media 1222. Together and, optionally, in combination with system memory 1210, computer-readable storage media 1222 may comprehensively represent remote, local, fixed, and/or removable storage devices plus storage media for temporarily and/or more permanently containing, storing, transmitting, and retrieving computer-readable information.

Computer-readable storage media 1222 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 1200.

By way of example, computer-readable storage media 1222 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program services, and other data for computer system 1200.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to connect to one or more devices via the Internet. In some embodiments, communications subsystem 1224 can include radio frequency (RF) transceiver components for accessing wireless voice and/or data networks (e.g., using cellular telephone technology, advanced data network technology, such as 3G, 4G, 5G or EDGE (enhanced data rates for global evolution), WiFi (IEEE 802.11 family standards, or other mobile communication technologies, or any combination thereof)), global positioning system (GPS) receiver components, and/or other components. In some embodiments, communications subsystem 1224 can provide wired network connectivity (e.g., Ethernet) in addition to or instead of a wireless interface.

In some embodiments, communications subsystem 1224 may also receive input communication in the form of structured and/or unstructured data feeds 1226, event streams 1228, event updates 1230, and the like on behalf of one or more users who may use computer system 1200.

By way of example, communications subsystem 1224 may be configured to receive data feeds 1226 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1224 may also be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1224 may also be configured to output the structured and/or unstructured data feeds 1226, event streams 1228, event updates 1230, and the like to one or more databases that may be in communication with one or more streaming data source computers coupled to computer system 1200.

Computer system 1200 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1200 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "including," "having," "including," and "containing" are to be construed as open-ended terms (i.e., meaning "including, but not limited to,") unless otherwise noted. The term "connected" is to be construed as a partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed:

1. A computer-implemented method comprising:
   populating a fake value for each entity within a set of entities, to generate a string of fake entity values that correspond to the entities, respectively;
   inserting a sentinel token between adjacent fake values included in the string of fake entity values to generate first input data;
   generating, by a natural language generation model, natural language sentences based on the first input data, wherein the natural language sentences comprise one or more fake values from the string of fake entity values;
   performing pre-processing on the natural language sentences, to generate pre-processed natural language sentences;
   analyzing the pre-processed natural language sentences to determine whether a fake value from the string of fake entity values is missing in the pre-processed natural language sentences;
   in response to determining that the fake value is missing, summarizing, using a text summarization model, the pre-processed natural language sentences to generate a text summary;
   concatenating the text summary with the fake value, to generate second input data;

generating, by a next sentence generation model, an additional natural language sentence, based on the second input data, wherein the additional natural language sentence comprises the fake value;

combining the additional natural language sentence with the pre-processed natural language sentences to generate a text portion comprising a first plurality of natural language sentences that are obtained as a result of the combining;

post-processing the result of the combining, to generate a collection of final natural language sentences; and outputting the collection of final natural language sentences.

2. The computer-implemented method of claim 1, wherein the pre-processing comprises:

tokenizing the natural language sentences into a series of tokens; and correcting, using a context correction model, context of the natural language sentences based on the series of tokens to generate corrected natural language sentences.

3. The computer-implemented method of claim 2, wherein:

the pre-processing further comprises:
determining a perplexity score for the corrected natural language sentences, and
extracting, from the corrected natural language sentences, natural language sentences having the perplexity score of less than a predetermined perplexity threshold, and the analyzing is performed on the extracted natural language sentences.

4. The computer-implemented method of claim 1, further comprising:

prior to the post-processing, analyzing the text portion to determine whether another fake value from the string of fake entity values is missing in the text portion;

in response to determining that the other fake value is missing, summarizing, using the text summarization model, the text portion to generate another text summary;

concatenating the other text summary with the other fake value, to generate third input data;

generating, by the next sentence generation model, a second additional natural language sentence based on the third input data, wherein the second additional natural language sentence comprises the other fake value; and combining the second additional natural language sentence with the text portion, to obtain another text portion comprising a second plurality of natural language sentences, wherein, in the post-processing, the second plurality of natural language sentences is used as the result of the combining.

5. The computer-implemented method of claim 1, wherein the post-processing comprises:

calculating, using a cross-encoder model, a similarity score between the first plurality of natural language sentences included in the text portion and existing natural language sentences; and determining the collection of final natural language sentences to include natural language sentences having the similarity score less than or equal to a predetermined similarity threshold, from the first plurality of natural language sentences.

6. The computer-implemented method of claim 1, wherein the outputting comprises at least one from among transmitting the collection of final natural language sentences to an external device and storing the collection of final natural language sentences in a memory.

7. The computer-implemented method of claim 1, further comprising:

after combining the additional natural language sentence with the pre-processed natural language sentences, repeating the analyzing and, thereafter, repeating the steps of summarizing, concatenating, generating, and combining, in response to determining that at least one other fake value from the string of fake entity values is missing in the text portion.

8. The computer-implemented method of claim 1, wherein the inserting further comprises:

appending to each fake value a symbol that identifies a type of entity for a corresponding fake value.

9. A system comprising:

one or more processors;

a memory that is coupled to the one or more processors and stores one or more instructions that, when executed by the one or more processors, cause the one or more processors to perform a method including:

populating a fake value for each entity within a set of entities, to generate a string of fake entity values that correspond to the entities, respectively;

inserting a sentinel token between adjacent fake values included in the string of fake entity values to generate first input data;

generating, by using a natural language generation model, natural language sentences based on the first input data, wherein the natural language sentences comprise one or more fake values from the string of fake entity values;

performing pre-processing on the natural language sentences, to generate pre-processed natural language sentences;

analyzing the pre-processed natural language sentences to determine whether a fake value from the string of fake entity values is missing in the pre-processed natural language sentences;

in response to determining that the fake value is missing, summarizing, by using a text summarization model, the pre-processed natural language sentences to generate a text summary;

concatenating the text summary with the fake value, to generate second input data;

generating, by using a next sentence generation model, an additional natural language sentence, based on the second input data, wherein the additional natural language sentence comprises the fake value;

combining the additional natural language sentence with the pre-processed natural language sentences to generate a text portion comprising a first plurality of natural language sentences that are obtained as a result of the combining;

post-processing the result of the combining, to generate a collection of final natural language sentences; and outputting the collection of final natural language sentences.

10. The system of claim 9, wherein:

the pre-processing includes:
tokenizing the natural language sentences into a series of tokens, correcting, using a context correction model, context of the natural language sentences based on the series of tokens to generate corrected natural language sentences, determining a perplexity score for the corrected natural language sentences, and extracting, from the corrected natural language sentences, natural language sentences having the perplexity score of less than a predetermined perplexity threshold, and the analyzing is performed on the extracted natural language sentences.

11. The system of claim 9, wherein the method further includes:

prior to the post-processing, analyzing the text portion to determine whether another fake value from the string of fake entity values is missing in the text portion;

in response to determining that the other fake value is missing, summarizing, using the text summarization model, the text portion to generate another text summary;

concatenating the other text summary with the other fake value, to generate third input data;

generating, by the next sentence generation model, a second additional natural language sentence based on the third input data, wherein the second additional natural language sentence comprises the other fake value; and combining the second additional natural language sentence with the text portion, to obtain another text portion comprising a second plurality of natural language sentences, wherein, in the post-processing, the second plurality of natural language sentences is used as the result of the combining.

12. The system of claim 9, wherein the post-processing includes:

calculating, using a cross-encoder model, a similarity score between the first plurality of natural language sentences included in the text portion and existing natural language sentences; and determining the collection of final natural language sentences to include natural language sentences having the similarity score less than or equal to a predetermined similarity threshold, from the first plurality of natural language sentences.

13. The system of claim 9, wherein the method further includes:

after combining the additional natural language sentence with the pre-processed natural language sentences, repeating the analyzing and, thereafter, repeating the steps of summarizing, concatenating, generating, and combining, in response to determining that at least one other fake value from the string of fake entity values is missing in the text portion.

14. The system of claim 9, wherein the inserting further includes:

appending to each fake value a symbol that identifies a type of entity for a corresponding fake value.

15. A non-transitory computer-readable memory storing one or more instructions that, when executed by one or more processors, cause the one or more processors to perform a method including:

populating a fake value for each entity within a set of entities, to generate a string of fake entity values that correspond to the entities, respectively;

inserting a sentinel token between adjacent fake values included in the string of fake entity values to generate first input data;

generating, by using a natural language generation model, natural language sentences based on the first input data, wherein the natural language sentences comprise one or more fake values from the string of fake entity values;

performing pre-processing on the natural language sentences, to generate pre-processed natural language sentences;

analyzing the pre-processed natural language sentences to determine whether a fake value from the string of fake entity values is missing in the pre-processed natural language sentences;

in response to determining that the fake value is missing, summarizing, by using a text summarization model, the pre-processed natural language sentences to generate a text summary;

concatenating the text summary with the fake value, to generate second input data;

generating, by using a next sentence generation model, an additional natural language sentence, based on the second input data, wherein the additional natural language sentence comprises the fake value;

combining the additional natural language sentence with the pre-processed natural language sentences to generate a text portion comprising a first plurality of natural language sentences that are obtained as a result of the combining;

post-processing the result of the combining, to generate a collection of final natural language sentences; and outputting the collection of final natural language sentences.

16. The non-transitory computer-readable memory of claim 15, wherein:

the pre-processing includes:

tokenizing the natural language sentences into a series of tokens, correcting, using a context correction model, context of the natural language sentences based on the series of tokens to generate corrected natural language sentences, determining a perplexity score for the corrected natural language sentences, and extracting, from the corrected natural language sentences, natural language sentences having the perplexity score of less than a predetermined perplexity threshold, and the analyzing is performed on the extracted natural language sentences.

17. The non-transitory computer-readable memory of claim 15, wherein the method further includes:

prior to the post-processing, analyzing the text portion to determine whether another fake value from the string of fake entity values is missing in the text portion;

in response to determining that the other fake value is missing, summarizing, using the text summarization model, the text portion to generate another text summary;

concatenating the other text summary with the other fake value, to generate third input data;

generating, by the next sentence generation model, a second additional natural language sentence based on the third input data, wherein the second additional natural language sentence comprises the other fake value; and combining the second additional natural language sentence with the text portion, to obtain another text portion comprising a second plurality of natural language sentences, wherein, in the post-processing, the second plurality of natural language sentences is used as the result of the combining.

18. The non-transitory computer-readable memory of claim 15, wherein the post-processing includes:

calculating, using a cross-encoder model, a similarity score between the first plurality of natural language sentences included in the text portion and existing natural language sentences; and determining the collection of final natural language sentences to include natural language sentences having the similarity score less than or equal to a predetermined similarity threshold, from the first plurality of natural language sentences.

19. The non-transitory computer-readable memory of claim 15, wherein the method further includes:

after combining the additional natural language sentence with the pre-processed natural language sentences, repeating the analyzing and, thereafter, repeating the steps of summarizing, concatenating, generating, and combining, in response to determining that at least one other fake value from the string of fake entity values is missing in the text portion.

20. The non-transitory computer-readable memory of claim 15, wherein the inserting further includes:

appending to each fake value a symbol that identifies a type of entity for a corresponding fake value.

* * * * *